(12) United States Patent
Yamashita et al.

(10) Patent No.: US 12,129,891 B2
(45) Date of Patent: Oct. 29, 2024

(54) SINTERED BEARING AND METHOD OF MANUFACTURING SAME

(71) Applicant: NTN CORPORATION, Osaka (JP)

(72) Inventors: Tomonori Yamashita, Aichi (JP); Yoshinori Ito, Aichi (JP); Daisuke Takeda, Aichi (JP); Yuta Ohashi, Aichi (JP)

(73) Assignee: NTN CORPORATION, Osaka (JP)

( * ) Notice: Subject to any disclaimer, the term of this patent is extended or adjusted under 35 U.S.C. 154(b) by 246 days.

(21) Appl. No.: 17/244,308

(22) Filed: Apr. 29, 2021

(65) Prior Publication Data

US 2021/0246948 A1    Aug. 12, 2021

Related U.S. Application Data

(62) Division of application No. 15/561,184, filed as application No. PCT/JP2016/058097 on Mar. 15, 2016, now abandoned.

(30) Foreign Application Priority Data

Mar. 27, 2015 (JP) ................................. 2015-066437
May 12, 2015 (JP) ................................. 2015-097357

(51) Int. Cl.
 *B22F 5/00* (2006.01)
 *C22C 33/02* (2006.01)
 (Continued)

(52) U.S. Cl.
 CPC .............. *F16C 33/121* (2013.01); *B22F 5/00* (2013.01); *C22C 33/0278* (2013.01);
 (Continued)

(58) Field of Classification Search
 CPC .... F16C 33/121; F16C 33/145; F16C 33/104; F16C 33/128; F16C 33/10; F16C 33/14;
 (Continued)

(56) References Cited

U.S. PATENT DOCUMENTS 4,238,221 A * 12/1980 Sevensson .......... C22C 33/0278
 75/352
4,540,437 A *  9/1985 Patel ........................ B22F 1/09
 420/560

(Continued)

FOREIGN PATENT DOCUMENTS

| CN | 103813874 | 5/2014 |
|---|---|---|
| CN | 104204574 | 12/2014 |

(Continued)

OTHER PUBLICATIONS

International Search Report issued Jun. 14, 2016 in International (PCT) Application No. PCT/JP2016/058097.

(Continued)

*Primary Examiner* — Humera N. Sheikh
*Assistant Examiner* — Kevin CT Li
(74) *Attorney, Agent, or Firm* — Wenderoth, Lind & Ponack, L.L.P.

(57) ABSTRACT

Provided is a sintered bearing formed mainly of an iron structure (33) and a copper structure (31) which are formed of a partially diffusion-alloyed powder (11) of an iron powder (12) and a copper powder (13). The sintered bearing includes a copper structure (31*d*) formed of a granular elemental copper powder (13') having a grain diameter of 45 μm or less, the ratio of the copper structure (31*d*) being 10 mass % or less. With this, a further increase in strength of the sintered bearing can be realized.

18 Claims, 15 Drawing Sheets

(51) Int. Cl.
    *C22C 38/00*    (2006.01)
    *C22C 38/16*    (2006.01)
    *F16C 33/10*    (2006.01)
    *F16C 33/12*    (2006.01)
    *F16C 33/14*    (2006.01)

(52) U.S. Cl.
    CPC ............ *C22C 38/00* (2013.01); *C22C 38/008* (2013.01); *C22C 38/16* (2013.01); *F16C 33/10* (2013.01); *F16C 33/104* (2013.01); *F16C 33/128* (2013.01); *F16C 33/14* (2013.01); *F16C 33/145* (2013.01); *B22F 2998/10* (2013.01); *F16C 2204/10* (2013.01); *F16C 2204/60* (2013.01); *F16C 2240/48* (2013.01); *Y10T 428/12014* (2015.01)

(58) Field of Classification Search
    CPC .............. F16C 2240/48; F16C 2204/60; F16C 2204/10; C22C 38/008; C22C 38/16; C22C 38/00; C22C 33/0278; B22F 5/00; B22F 2998/10; Y10T 428/12014
    See application file for complete search history.

(56) References Cited

U.S. PATENT DOCUMENTS

| | | | |
|---|---|---|---|
| 6,355,208 B1 | 3/2002 | Unami et al. | |
| 2011/0057527 A1* | 3/2011 | Mori ................... | C10M 133/12 310/90 |
| 2012/0177528 A1* | 7/2012 | Takayama ............... | F16C 33/14 228/199 |
| 2014/0234152 A1 | 8/2014 | Ito et al. | |
| 2015/0043844 A1* | 2/2015 | Hori .................... | F16C 32/0629 384/114 |
| 2016/0301279 A1 | 10/2016 | Ito et al. | |

FOREIGN PATENT DOCUMENTS

| | | | | |
|---|---|---|---|---|
| JP | 8-92604 | | 4/1996 | |
| JP | 08092604 A | * | 4/1996 | |
| JP | 11-343492 | | 12/1999 | |
| JP | 2001-251069 | | 9/2001 | |
| JP | 3613569 | | 1/2005 | |
| JP | 2007-31841 | | 2/2007 | |
| JP | 2008-255273 | | 10/2008 | |
| JP | 2010-077474 | | 4/2010 | |
| JP | 2010-276051 | | 12/2010 | |
| JP | 2011-094167 | | 5/2011 | |
| JP | 2012-013167 | | 1/2012 | |
| JP | 2013-79438 | | 5/2013 | |
| JP | 2013079438 A | * | 5/2013 | ............ B22F 1/0003 |
| JP | 2013-159795 | | 8/2013 | |
| JP | 2013-255384 | | 12/2013 | |
| JP | 2013255384 A | * | 12/2013 | |
| JP | 5391526 | | 1/2014 | |
| JP | 5442145 | | 3/2014 | |
| JP | 2014101994 A | * | 6/2014 | ............ B22F 1/0059 |
| JP | 2014-219097 | | 11/2014 | |

OTHER PUBLICATIONS

International Preliminary Report on Patentability and Written Opinion of the International Searching Authority issued Oct. 3, 2017 in International (PCT) Application No. PCT/JP2016/058097.

Office Action issued Oct. 15, 2018 in corresponding Chinese Application No. 201680018830.4, with partial translation.

Notice of Reasons for Refusal issued Jan. 21, 2020 in corresponding Japanese Patent Application No. 2019-031838 with English translation.

Notice of Reasons for Refusal issued Aug. 31, 2020 in corresponding Japanese Patent Application No. 2019-031838, with Machine translation.

* cited by examiner

IRON STRUCTURE

COPPER STRUCTURE

IRON STRUCTURE

COPPER STRUCTURE

SINTERED BEARING AND METHOD OF MANUFACTURING SAME

TECHNICAL FIELD

The present invention relates to a sintered bearing and a method of manufacturing the sintered bearing.

BACKGROUND ART

A sintered bearing is formed of a porous body having innumerable inner pores, and is generally used in the state in which a lubricating fluid (for example, a lubricating oil) is impregnated into these inner pores. In this case, the lubricating oil retained in the inner pores of the sintered bearing seeps out onto an inner peripheral surface (bearing surface) of the sintered bearing along with an increase in temperature when the sintered bearing and a shaft inserted into its inner periphery relatively rotate. Then, with the lubricating oil thus seeping out, an oil film is formed in a bearing clearance between the bearing surface of the sintered bearing and an outer peripheral surface of the shaft, and thus the shaft is supported in a relatively rotatable manner.

For example, in Patent Literature 1, there is disclosed, as a copper-iron-based sintered bearing containing as main components iron and copper, a sintered bearing obtained by compacting and sintering copper-covered iron powder in which iron powder is covered with copper in an amount of 10 mass % or more and less than 30 mass % with respect to the iron powder and whose grain size is set to 80 mesh or less.

CITATION LIST

Patent Literature 1: JP 3613569 B2
Patent Literature 2: JP 5442145 B1

SUMMARY OF INVENTION

Technical Problem

However, it has been revealed that, when a sintered bearing obtained by applying the technical measure of Patent Literature 1 is used for a vibration motor configured to function as a vibrator of a portable terminal or the like, its bearing surface is subjected to early wear to increase fluctuation in rotation. This is presumably because a sintered bearing obtained by molding and sintering copper-covered iron powder has low neck strength between an iron phase (iron structure) and a copper phase (copper structure), and hence grains constituting its bearing surface are liable to be peeled. Therefore, in order to put the sintered bearing in such application into practical use, it is desired that bonding strength between the iron structure and the copper structure be improved.

For example, in Patent Literature 2, there is a description that a sintered bearing excellent in wear resistance and having high strength is obtained through use of raw material powder formed mainly of partially diffusion-alloyed powder obtained by bonding iron powder and copper powder through partial diffusion. In Patent Literature 2, the following is also described. When the raw material powder contains partially diffusion-alloyed powder having a large grain diameter, coarse pores are liable to be formed in the inside of a sintered compact. As a result, required wear resistance of the bearing surface, radial crushing strength, and the like cannot be secured in some cases. Therefore, the partially diffusion-alloyed powder to be used preferably has an average grain size of 145 mesh or less (an average grain diameter of 106 μm or less).

However, recently, there has been a demand for a further increase in strength of a sintered bearing to be used for a vibration motor or the like. The demanded strength cannot be satisfied by such sintered bearing as described above in some cases.

In view of the above-mentioned circumstances, an object of the present invention is to realize a further increase in strength of a copper-iron-based sintered bearing using partially diffusion-alloyed powder.

Solution to Problem

In order to achieve the above-mentioned object, according to one embodiment of the present invention, there is provided a sintered bearing, which is formed mainly of an iron structure and a copper structure which are formed of partially diffusion-alloyed powder of iron powder and copper powder, the sintered bearing comprising a copper structure formed of granular elemental copper powder having a grain diameter of 45 μm or less, a ratio of the copper structure formed of the elemental copper powder being 10 mass % or less.

In order to achieve the above-mentioned object, according to one embodiment of the present invention, there is also provided a method of manufacturing a sintered bearing, comprising the steps of: classifying partially diffusion-alloyed powder of iron powder and copper powder by passage through a sieve; compression-molding raw material powders containing the classified partially diffusion-alloyed powder to form a green compact; and sintering the green compact to form a sintered compact, the raw material powders containing, at a ratio of 10 mass % or less, elemental copper powder that has escaped from the partially diffusion-alloyed powder as a result of the classifying.

Herein, powder having a grain diameter of a predetermined value or less means powder that can pass through a sieve having an opening of the predetermined value, and powder having a grain diameter of more than a predetermined value means powder that remains on a sieve having an opening of the predetermined value.

As described above, the sintered bearing is formed of a sintered metal formed mainly of the partially diffusion-alloyed powder in which part of copper powder is diffused in iron powder, and hence high neck strength is obtained between the copper structure (structure containing as a main component copper) and the iron structure (structure containing as a main component iron) after the sintering. Thus, the copper structure and the iron structure are prevented from escaping from a bearing surface, and the wear resistance of the bearing surface can be enhanced. In addition, the strength of the sintered bearing can be enhanced. As a result, even when the sintered bearing is press-fitted and fixed to an inner periphery of a housing, the bearing surface does not deform in accordance with the shape of an inner peripheral surface of the housing, and a bearing surface having high accuracy can be achieved. In addition, a base of the bearing surface is strengthened, and hence deformation of the bearing surface can be suppressed when a shaft is brought into contact with the bearing surface owing to vibration or the like.

When a sintered bearing formed mainly of partially diffusion-alloyed powder is formed as described above, it has heretofore been considered that the use of partially diffusion-alloyed powder having a small grain diameter (free of coarse grains) is less liable to lead to the formation of coarse pores, and hence can enhance the wear resistance and strength of the sintered bearing. However, investigations made by the inventors of the present invention have revealed that, when the partially diffusion-alloyed powder having a small grain diameter is used, the strength reduces contrarily for the following reason. That is, in order to obtain the partially diffusion-alloyed powder having a small grain diameter, classification by sieving is performed, and during the sieving, part of the copper powder escapes from the partially diffusion-alloyed powder and passes through the sieve, with the result that elemental copper powder contaminates the partially diffusion-alloyed powder after the classification. For example, when 25 mass % Cu—Fe partially diffusion-alloyed powder was sieved using a sieve of 145 mesh (opening: 106 µm) and then the component ratio of the resultant powder was investigated, it was found that the resultant powder contained about 40 mass % of Cu. That is, it was found that the partially diffusion-alloyed powder after the sieving was contaminated with as much as about 15 mass % of elemental copper powder. Accordingly, even if the partially diffusion-alloyed powder after the classification is blended in a predetermined amount into raw material powders, the ratio of the partially diffusion-alloyed powder is actually lower in proportion to the amount of contamination with the elemental copper powder. Thus, the strength-improving effect of the use of the partially diffusion-alloyed powder is reduced, resulting in a reduction in strength of the sintered bearing.

In view of the foregoing, the inventors of the present invention have conceived the idea of enlarging the opening of the sieve to be used for the classification of the partially diffusion-alloyed powder, to thereby reduce the amount of the elemental copper powder contained in the partially diffusion-alloyed powder after the classification. That is, when the opening of the sieve is small, a large amount of the partially diffusion-alloyed powder remains on the sieve, and hence the amount of the elemental copper powder that escapes from the partially diffusion-alloyed powder remaining on the sieve increases, resulting in an increase in amount of the elemental copper powder contaminating the partially diffusion-alloyed powder after the classification. Meanwhile, when the opening of the sieve is large, the amount of the partially diffusion-alloyed powder that remains on the sieve decreases, and hence the amount of the elemental copper powder that escapes from the partially diffusion-alloyed powder remaining on the sieve reduces, resulting in a reduction in amount of the elemental copper powder contaminating the partially diffusion-alloyed powder after the classification. For example, when 25 mass % Cu—Fe partially diffusion-alloyed powder was sieved using a sieve of 100 mesh (opening: 150 µm) and then the component ratio of the resultant powder was confirmed, it was found that the resultant powder contained about 30 mass % of Cu. That is, it was found that the ratio of the contaminating elemental copper powder in the partially diffusion-alloyed powder after the sieving was suppressed to about 5 mass %. As described above, when the partially diffusion-alloyed powder in which the ratio of the elemental copper powder is low (specifically 10 mass % or less) is used, the ratio of the elemental copper powder contained in the raw material powders is reduced. As a result, the ratio of partially diffusion-alloyed powder in which the copper powder and the iron powder are firmly bonded to each other increases to enhance the strength of the sintered bearing.

In order to adjust the ratio of the copper structure formed of the granular elemental copper powder having a grain diameter of 45 µm or less (elemental copper powder that has escaped from the partially diffusion-alloyed powder as a result of the sieving) to 10 mass % or less as described above, for example, it is recommended to set the opening of the sieve to be used for the classification of the partially diffusion-alloyed powder to 125 µm or more. The partially diffusion-alloyed powder subjected to such classification contains 30 mass % or more, preferably 50 mass % or more, more preferably 60 mass % or more of powder having a grain diameter of more than 106 µm (145 mesh).

When the partially diffusion-alloyed powder having a relatively large grain diameter is used as described above, although the ratio of the partially diffusion-alloyed powder in the raw material powders increases to realize an improvement in strength, coarse pores are liable to be formed in the inside of the sintered compact. Therefore, there is a fear that the wear resistance and the strength may be reduced. In view of this, when the density of the above-mentioned sintered bearing is increased (specifically to 7.0 g/cm$^3$ or more), the formation of the coarse pores can be suppressed to prevent the reduction in strength.

The sintered bearing preferably further comprises a low-melting point substance (for example, tin, zinc, or phosphorus) having a melting point lower than that of copper. A metal containing the low-melting point substance (for example, tin powder, zinc alloy powder, or phosphorus alloy powder) wets the surface of copper to promote the diffusion of copper during the sintering. Thus, a bonding force between metal grains (between the copper powder and the iron powder, and between the copper powder and the copper powder) can be increased. It is preferred that the low-melting point substance be blended in a relatively larger amount (for example, from 2 mass % to 3 mass %) into the sintered bearing.

The above-mentioned sintered bearing preferably further comprises a surface layer formed mainly of flat copper powder arranged substantially parallel to a surface of the sintered bearing. The flat copper powder assumes a foil-like shape, and hence has a property of adhering onto a molding surface at the time of the molding of the raw material powders. Therefore, the green compact obtained after the molding contains a large amount of copper in its surface layer. As a result, a surface layer having a large content of copper is formed in the sintered compact obtained after the sintering (it is preferred that a copper structure be formed on a surface of the surface layer at an area ratio of 60% or more). The surface layer increased in content of copper as described above can realize improvements in initial running-in property and quietness, and can provide good sliding characteristics. In addition, aggressiveness to a shaft is reduced as well, and hence durability life is prolonged. Besides, a copper-rich bearing surface less susceptible to oxidation is formed, and hence fretting wear of the bearing surface can be prevented.

For example, when the sintered bearing is ultra thin (with, for example, a thickness of 0.5 µm or less), if the grain diameter of the partially diffusion-alloyed powder is excessively large, high-accuracy molding is difficult. Accordingly, the grain diameter of the partially diffusion-alloyed powder is preferably set to be equal to or less than ½ of the minimum thickness of the sintered bearing.

The sintered bearing according to the embodiment of the present invention further comprises: a sintered compact; and a grease impregnated into the sintered compact, wherein the grease contains a thickener, and a base oil having a kinematic viscosity at 40° C. of 40 mm$^2$/s or more and 60 mm$^2$/s or less, and a kinematic viscosity at 100° C. of 5 mm$^2$/s or more and 10 mm²/s or less according to a kinematic viscosity measurement method based on JIS K 2283, and a concentration of the thickener in the grease is from 0.1 wt % to 3 wt %.

In this sintered bearing, the sintered compact is impregnated with the grease instead of a lubricating oil. The thickener of the grease retains the base oil even in fine pores of the sintered compact by virtue of its network structure, and hence has a high oil retaining property. Therefore, as compared to the case of impregnation with the lubricating oil, evaporation and outflow of the base oil are less liable to occur even at high temperature. In addition, a base oil having a higher kinematic viscosity at 100° C. is selected as the base oil, and hence outflow of the base oil from the fine pores is less liable to occur even at high temperature. Therefore, for example, even when the sintered bearing is temporarily heated to high temperature during reflow soldering of a vibration device onto a circuit board, evaporation and outflow of the base oil from the sintered bearing can be suppressed. Meanwhile, the kinematic viscosity of the base oil is small at 40° C., and hence frictional resistance at a sliding portion between a shaft and the bearing surface can be reduced during use of the bearing.

According to this sintered bearing, in a device having incorporated therein the sintered bearing, evaporation and outflow of the lubricating oil during temporary heating, for example, at the time of mounting of the device can be suppressed. In addition, the frictional resistance of the sliding portion during use of the device can be reduced.

It is preferred to use a poly-α-olefin-based synthetic lubricating oil as the base oil. In addition, a poly-α-olefin-based synthetic lubricating oil and an ester-based synthetic lubricating oil may also be used as the base oil.

It is preferred to use a lithium soap as the thickener.

The sintered bearing described above is incorporated into a device to be reflow-soldered onto a circuit board. In addition, a device according to one embodiment of the present invention comprises the above-mentioned sintered bearing, and is to be soldered onto a circuit board through use of a reflow solder. The device in this case may be a device configured to generate vibration by moving a weight in a reciprocating manner in an axial direction.

Advantageous Effects of Invention

As described above, in the sintered bearing of the present invention, the ratio of the copper structure formed of the granular elemental copper powder having a grain diameter of 45 μm or less is set to 10 mass % or less to increase the ratio of the partially diffusion-alloyed powder. Accordingly, a further increase in strength of the copper-iron-based sintered bearing can be realized.

DESCRIPTION OF EMBODIMENTS

Now, an embodiment of the present invention is described with reference to the accompanying drawings.

Figure 1:
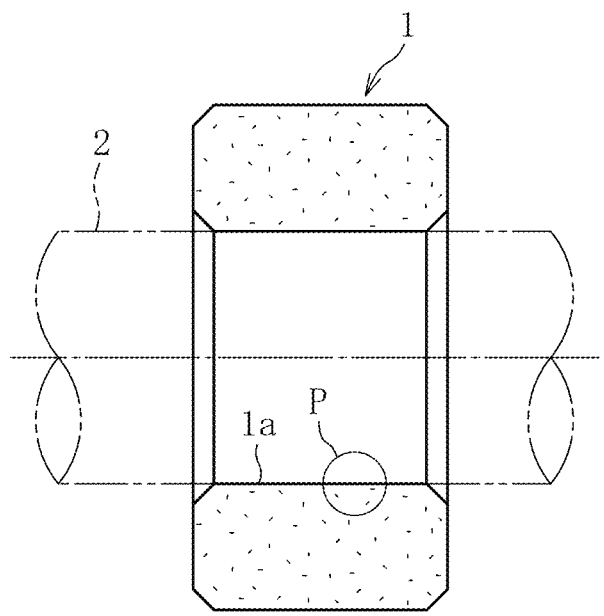
FIG. 1 is a sectional view of a sintered bearing according to the present invention.

As illustrated in FIG. 1, a sintered bearing 1 is formed into a cylindrical shape having a bearing surface 1a on an inner periphery thereof. The sintered bearing 1 of this embodiment is used by impregnating a lubricating oil into inner pores of a porous sintered compact (also called an oil-impregnated sintered bearing). A shaft 2 made of stainless steel or the like is inserted into the inner periphery of the sintered bearing 1, and the shaft or the bearing 1 is rotated in this state. Then, the lubricating oil retained in innumerable pores of the sintered bearing 1 seeps out onto the bearing surface 1a along with temperature rise. Due to the lubricating oil thus seeping out, an oil film is formed in a bearing clearance between an outer peripheral surface of the shaft and the bearing surface 1a, and thus the shaft 2 is supported by the bearing 1 in a relatively rotatable manner.

Figure 2:
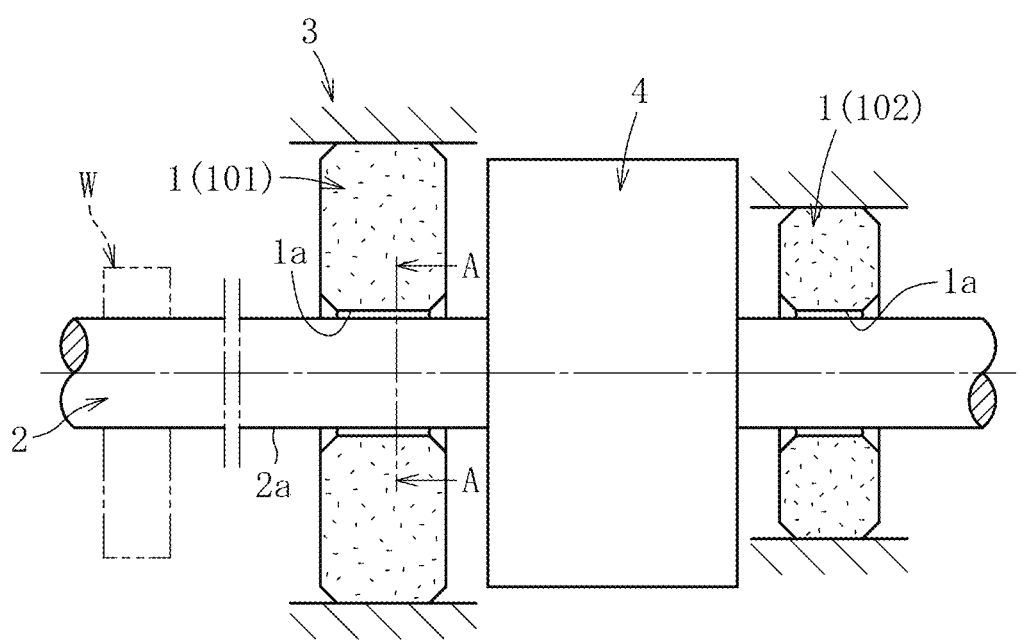
FIG. 2 is a schematic sectional view of a main portion of a vibration motor.

The sintered bearing 1 illustrated in FIG. 1 can be used for a vibration motor which functions as a vibrator configured to notify the user of an incoming call, mail reception, or the like in a portable terminal etc. including a mobile phone and a smartphone. As illustrated in FIG. 2, the vibration motor has a configuration in which a housing 3 of the vibration motor, and by extension the entirety of a portable terminal is vibrated through rotation of a weight (eccentric weight) W mounted to one end of the shaft 2 by a motor part 4. Conceptually illustrated in FIG. 2 is a main portion of the vibration motor using two sintered bearings 1 (101, 102). In the illustrated example, both sides of the shaft 2 protruding from the motor part 4 on both sides thereof in an axial direction are supported by the sintered bearings 1 (101, 102) in a rotatable manner. The sintered bearing 101 on a weight W side is arranged between the weight W and the motor part 4, and the sintered bearing 101 on the weight W side is formed into a large thickness and a large diameter as compared to the sintered bearing 102 on the opposite side to the weight W. The two sintered bearings 1 each have the bearing surface 1a on its inner periphery, and are each fixed to the inner periphery of the housing 3 formed of, for example, a metal material by means of press-fitting or the like.

Figure 3:
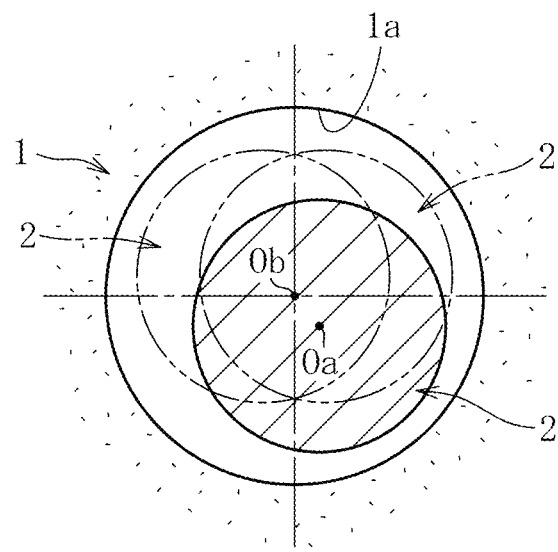
FIG. 3 is a sectional view taken along the line A-A of FIG. 2.

In the vibration motor, the shaft 2 is driven at a rotation number of 10,000 rpm or more. When the shaft 2 rotates, the shaft 2 rotates while oscillating along the entire surface of the bearing surface 1a under the influence of the weight W. In a general-use sintered bearing, the shaft 2 is configured to rotate while keeping an eccentric state in a direction of the gravitational force. However, in the sintered bearing 1 for a vibration motor, as illustrated in FIG. 3, the shaft 2 is configured to rotate under the state in which the center Oa of the shaft is eccentric with respect to the center Ob of the bearing not only in the direction of the gravitational force but also in all directions.

As described above, in the bearing for a vibration motor, the shaft 2 is configured to oscillate along the entire surface of the bearing surface, and further, the bearing surface is frequently beaten by the shaft owing to an unbalanced load (the shaft is frequently brought into slide contact with the bearing surface). Therefore, the bearing surface is liable to be worn as compared to that in the general-use sintered bearing. In addition, when the bearing surface even slightly deforms in accordance with the shape of the inner peripheral surface of the housing through press-fitting of the sintered bearing to the inner periphery of the housing 3, the rotation accuracy of the shaft 2 is largely affected. Those problems can be solved by using the sintered bearing 1 of the present invention for the vibration motor.

The sintered bearing 1 described above is formed by loading, into a mold, raw material powders obtained by mixing various powders, and compressing the raw material powders to form a green compact, followed by sintering the green compact.

The raw material powders are mixed powders containing as main components partially diffusion-alloyed powder, flat copper powder, low-melting point metal powder, and solid lubricant powder. Various molding aids as typified by a lubricant (such as a metal soap) for improving mold releasability are added to the mixed powder as necessary. Now, detailed description is given of raw material powders and a manufacturing procedure for the sintered bearing 1 according to a first embodiment.

[Partially Diffusion-Alloyed Powder]

Figure 4:
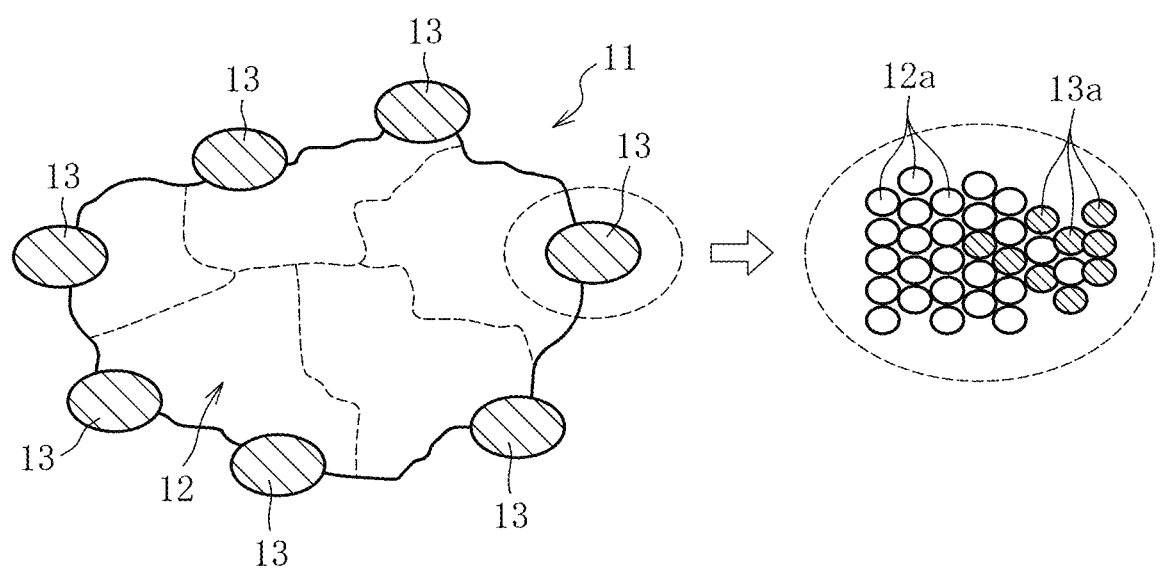
FIG. 4 is an enlarged view for schematically illustrating partially diffusion-alloyed powder.

As illustrated in FIG. 4, an Fe—Cu partially diffusion-alloyed powder 11 in which a number of grains of copper powder 13 are partially diffused on and bonded to the surface of an iron powder 12 is used as the partially diffusion-alloyed powder. A partial diffusion portion of the partially diffusion-alloyed powder 11 forms an Fe—Cu alloy. Specifically, as illustrated in a partial enlarged view in FIG. 4, the partially diffusion-alloyed powder 11 has a crystal structure in which, at a boundary between the iron powder 12 and the copper powder 13, part of the copper structure (copper atoms 13a) diffuses into the iron structure and part of the iron structure (iron atoms 12a) diffuses into the copper structure, and thus the iron atoms 12a and the copper atoms 13a are partially replaced with each other.

As the iron powder 12 constituting the partially diffusion-alloyed powder 11, reduced iron powder, atomized iron powder, or other known iron powders may be used. In this embodiment, the reduced iron powder is used. The reduced iron powder has a substantially spherical but irregular shape. Further, the reduced iron powder has a sponge-like shape (porous shape) having inner pores, and hence the reduced iron powder is also called sponge iron powder. The iron powder 12 constitutes most part of the partially diffusion-alloyed powder 11.

In addition, as the copper powder 13 constituting the partially diffusion-alloyed powder 11, generally-used irregular or dendritic copper powder may be used widely. For example, electrolytic copper powder, atomized copper powder, or the like is used. In this embodiment, the atomized copper powder, which has a number of irregularities on its surface, has a substantially spherical but irregular shape in the entirety of its grain, and is excellent in formability, is used. The copper powder 13 assumes a granular shape, and is clearly distinguished from the flat copper powder having a foil-like shape to be described later. As the copper powder 13, copper powder having a grain diameter smaller than that of the iron powder 12 is used. Specifically, copper powder having a grain diameter of 45 μm or less, preferably 30 μm or less is used. In addition, as the copper powder 13, copper powder having a grain diameter of 5 μm or more, preferably 10 μm or more is used. The ratio of Cu in the partially diffusion-alloyed powder 11 is set to from 10 mass % to 30 mass % (preferably from 22 mass % to 26 mass %).

Figure 5:
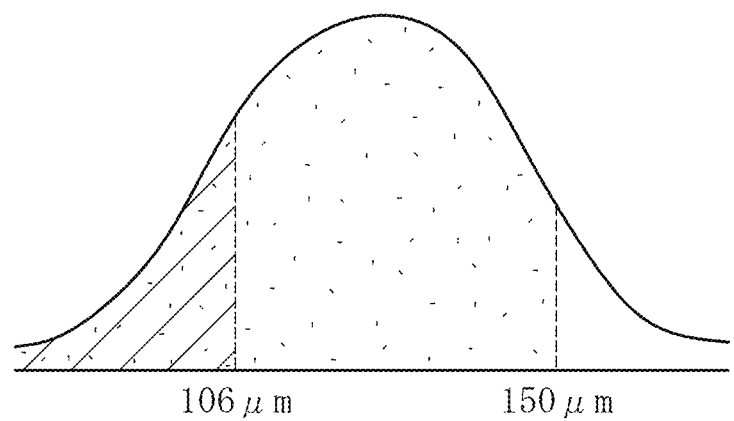
FIG. 5 is a graph for showing the grain size distribution of the partially diffusion-alloyed powder.

As the partially diffusion-alloyed powder 11, partially diffusion-alloyed powder from which coarse grains have been eliminated through classification using a sieve is used. The opening of the sieve is set to preferably 125 μm (120 mesh) or more, more preferably 135 μm (110 mesh) or more. In this embodiment, the classification is performed using a sieve having an opening of 150 μm (100 mesh) to provide the partially diffusion-alloyed powder 11 having a grain diameter of 150 μm or less. The grain size distribution of the partially diffusion-alloyed powder before the classification often shows such a normal distribution as shown in FIG. 5. Hitherto, such partially diffusion-alloyed powder has been classified with a sieve having a relatively small opening (for example, 106 μm) and powder in the shaded region in the FIG. 5 has been used. However, in this embodiment, the partially diffusion-alloyed powder is classified with a sieve having a relatively large opening (for example, 150 μm) and powder in the dotted region in FIG. 5 is used. In the grain size distribution of the partially diffusion-alloyed powder after the classification, the frequency abruptly changes at 150 µm and becomes nearly equal to 0 at 150 µm or more. In addition, the powder after the classification contains a relatively large amount of partially diffusion-alloyed powder having a large grain diameter, and specifically contains powder having a grain diameter of more than 106 µm (powder remaining on a sieve having an opening of 106 µm) at 30 mass % or more, preferably 50 mass % or more, more preferably 60 mass % or more, and at about 65 mass % in this embodiment.

Through the classification using the sieve having a relatively large opening as described above, the ratio of elemental copper powder that escapes from the partially diffusion-alloyed powder as a result of sieving can be reduced, and hence the amount of elemental copper powder contaminating the partially diffusion-alloyed powder after the classification can be reduced. Specifically, the ratio of the granular elemental copper powder having a grain diameter of 45 µm or less in the powder after the classification (i.e., powder that has passed through the sieve) is set to 10 mass % or less, preferably 8 mass % or less, more preferably 5 mass % or less.

In addition, it is preferred that ultrafine grains be eliminated from the partially diffusion-alloyed powder 11 to prevent a reduction in powder filling property in a compacting step. Specifically, the ratio of powder having a grain diameter of 45 µm (350 mesh) or less in the partially diffusion-alloyed powder 11 is preferably set to less than 25 mass %.

The grain diameter (average diameter of grains) may be measured by a laser diffraction/scattering method (using, for example, SALD-31000 manufactured by Shimadzu Corporation) involving irradiating a group of grains with laser light, and determining a grain size distribution, and by extension a grain diameter through calculation from an intensity distribution pattern of diffracted/scattered light emitted therefrom.

[Flat Copper Powder]

Figure 6:
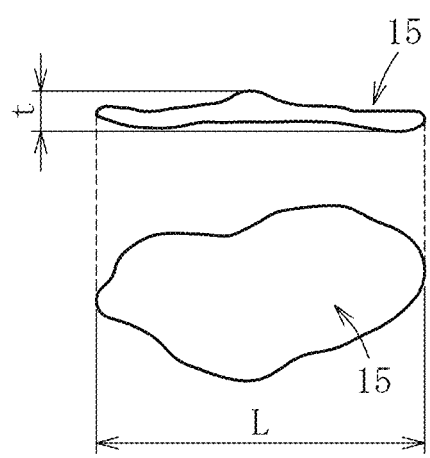
FIG. 6 is an illustration of flat copper powder in side view on an upper side and in plan view on a lower side.

The flat copper powder is obtained by flattening raw material copper powder containing water-atomized powder and the like through stamping or pulverization. The flat copper powder assumes a foil-like shape, specifically a foil-like shape having an aspect ratio L/t of a length L to a thickness t of 10 or more. In this embodiment, as the flat copper powder, there is mainly used flat copper powder having a length L of from 20 µm to 80 µm and a thickness t of from 0.5 µm to 1.5 µm (aspect ratio L/t=13.3 to 160). The "length" and the "thickness" herein refer to the maximum geometric dimensions of individual grains of flat copper powder 15 as illustrated in FIG. 6. The apparent density of the flat copper powder is set to 1.0 g/cm$^3$ or less. When the flat copper powder having the above-mentioned size and apparent density is used, the force of adhesion of the flat copper powder to a molding surface is increased, and hence a large amount of flat copper powder can be caused to adhere onto the molding surface.

[Fluid Lubricant]

In order to cause the flat copper powder to adhere onto the molding surface, a fluid lubricant is caused to adhere to the flat copper powder in advance. The fluid lubricant only needs to be caused to adhere to the flat copper powder before loading the raw material powders into the mold. Specifically, the fluid lubricant is caused to adhere to the raw material copper powder preferably before mixing the raw material powders, further preferably in the stage of stamping the raw material copper powder. The fluid lubricant may be caused to adhere to the flat copper powder by means of, for example, feeding the fluid lubricant to the flat copper powder and agitating the fluid lubricant and the flat copper powder within a period after stamping the raw material copper powder until mixing the flat copper powder with other raw material powders. In order to secure an amount of the flat copper powder adhering onto the molding surface, the blending ratio of the fluid lubricant to the flat copper powder is set to 0.1 wt % or more, desirably 0.2 mass % or more. In addition, in order to prevent coagulation due to the adhesion of grains of the flat copper powder to each other, the blending ratio of the fluid lubricant to the flat copper powder is set to 0.8 wt % or less, desirably 0.7 mass % or less. As the fluid lubricant, a fatty acid, in particular, a linear saturated fatty acid is preferred. This kind of fatty acid is expressed by a general formula of $C_{n-1}H_{2n-1}COOH$. As this fatty acid, a fatty acid having n within a range of from 12 to 22 may be used, and stearic acid may be used as a specific example.

[Low-Melting Point Metal Powder]

The low-melting point metal powder is metal powder containing a low-melting point substance, for example, tin, zinc, or phosphorus, having a melting point lower than that of copper, and having a melting point lower than a sintering temperature. In this embodiment, as the low-melting point metal powder, metal powder having a melting point of 700° C. or less, for example, powder such as tin powder, zinc alloy powder (zinc-copper alloy powder), or phosphorus alloy powder (phosphorus-copper alloy powder) is used. Among others, it is preferred to use tin powder that is less evaporated at the time of sintering. As the low-melting point metal powder, low-melting point metal powder having a grain diameter smaller than that of the partially diffusion-alloyed powder 11 is preferably used. In this embodiment, the grain diameter of the low-melting point metal powder is set to from 5 µm to 45 µm. Those low-melting point metal powders have high wettability to copper. When the low-melting point metal powder is blended in the raw material powders, the low-melting point metal powder melts first at the time of sintering to wet the surface of the copper powder, and promotes the diffusion of copper into iron. With this, the bonding strength between iron grains and copper grains, and the bonding strength between respective copper grains are increased.

[Solid Lubricant Powder]

The solid lubricant powder is added so as to reduce friction at the time of metal contact due to sliding between the sintered bearing 1 and the shaft 2, and graphite is used as an example. As graphite powder in this case, it is desired to use flake graphite powder so as to attain adhesiveness to the flat copper powder. As the solid lubricant powder, molybdenum disulfide powder may be used as well as the graphite powder. The molybdenum disulfide powder has a layered crystal structure, and is peeled in a layered shape. Thus, the adhesiveness to the flat copper powder is attained similarly to flake graphite.

[Blending Ratio]

With regard to the blending ratio of each of the above-mentioned powders in the raw material powders, it is preferred to blend the partially diffusion-alloyed powder (including the granular elemental copper powder having a grain diameter of 45 µm or less) at from 75 mass % to 95 mass %, the flat copper powder at from 5 mass % to 20 mass %, the low-melting point metal powder (for example, tin powder) at from 0.8 mass % to 6.0 mass % (preferably from 2.0 mass % to 3.0 mass %), and the solid lubricant powder (for example, graphite powder) at from 0.3 mass % to 1.0 mass %. In addition, the ratio of the granular elemental copper powder having a grain diameter of 45 µm or less contaminating the partially diffusion-alloyed powder (i.e., elemental copper powder that has escaped from the partially diffusion-alloyed powder as a result of the sieving) is set to 10 mass % or less with respect to the entirety of the raw material powders. The reason why the blending ratio of each powder is set as described above is given below.

When the ratio of the partially diffusion-alloyed powder is set to 75 mass % or more, the strength of the sintered bearing can be sufficiently enhanced. In particular, when partially diffusion-alloyed powder in which the contamination ratio of the granular elemental copper powder having a grain diameter of 45 μm or less is low is used, the actual ratio of the partially diffusion-alloyed powder can be sufficiently secured, and hence a reduction in strength of the sintered bearing due to contamination with the elemental copper powder is suppressed. In addition, in this embodiment, as described later, the flat copper powder is caused to adhere in a layered shape to the mold at the time of loading the raw material powders into the mold. When the blending ratio of the flat copper powder in the raw material powders is less than 8 wt %, the amount of the flat copper powder adhering onto the mold becomes insufficient, and hence the actions and effects of the present invention cannot be expected. In addition, the amount of the flat copper powder adhering onto the mold is saturated at about 20 mass %. A further increase in blending amount of the flat copper powder poses a problem of increasing cost owing to the use of the costly flat copper powder. When the ratio of the low-melting point metal powder is less than 0.8 mass %, the strength of the bearing cannot be secured. When the ratio of the low-melting point metal powder exceeds 6.0 mass %, the spheroidization effect on the flat copper powder cannot be ignored. In particular, when the low-melting point metal powder is blended at 2.0 mass % or more, the strength of the bearing can be further enhanced. In addition, when the ratio of the solid lubricant powder is less than 0.5 wt %, the effect of reducing the friction on the bearing surface is not obtained. When the ratio of the solid lubricant powder exceeds 2.0 mass %, a reduction in strength or the like occurs.

[Mixing]

Figure 7:
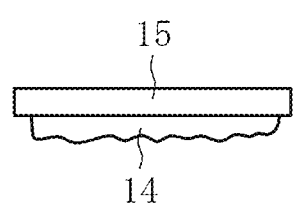
FIG. 7 is a side view for illustrating the flat copper powder and flake graphite that adhere to each other.

It is desired that the above-mentioned powders be mixed through two separate operations. First, as primary mixing, flake graphite powder and flat copper powder having a fluid lubricant caused to adhere thereto in advance are mixed together with a known mixer. Subsequently, as secondary mixing, partially diffusion-alloyed powder (including granular elemental copper powder having a grain diameter of 45 μm or less) and low-melting point metal powder are added to and mixed with the primarily-mixed powder. The flat copper powder has a low apparent density among the various raw material powders, and is therefore difficult to uniformly disperse in the raw material powders. Thus, when the flat copper powder and the graphite powder having an apparent density at the same level are mixed together in advance through the primary mixing, as illustrated in FIG. 7, the flat copper powder 15 and a graphite powder 14 are caused to adhere to each other and superimposed in a layered shape due to, for example, the fluid lubricant adhering to the flat copper powder, and accordingly the apparent density of the flat copper powder is increased. Therefore, the flat copper powder can be dispersed uniformly in the raw material powders at the time of secondary mixing. When a lubricant is separately added at the time of primary mixing, the adhesion between the flat copper powder and the graphite powder is further promoted, and hence the flat copper powder can be dispersed more uniformly at the time of secondary mixing. As the lubricant to be added in this case, a fluid lubricant of the same kind as or the different kind from the above-mentioned fluid lubricant may be used, and a powder lubricant may be used as well. For example, the above-mentioned molding aid, such as a metal soap, is generally powdery, but has an adhesion force to some extent so that the adhesion between the flat copper powder and the graphite powder can further be promoted.

The adhesion state between the flat copper powder 15 and the flake graphite powder 14 as illustrated in FIG. 7 is maintained to some extent even after the secondary mixing, and hence, when the raw material powders are loaded into the mold, a large amount of graphite powder is caused to adhere onto the surface of the mold together with the flat copper powder.

[Molding]

Figure 8:
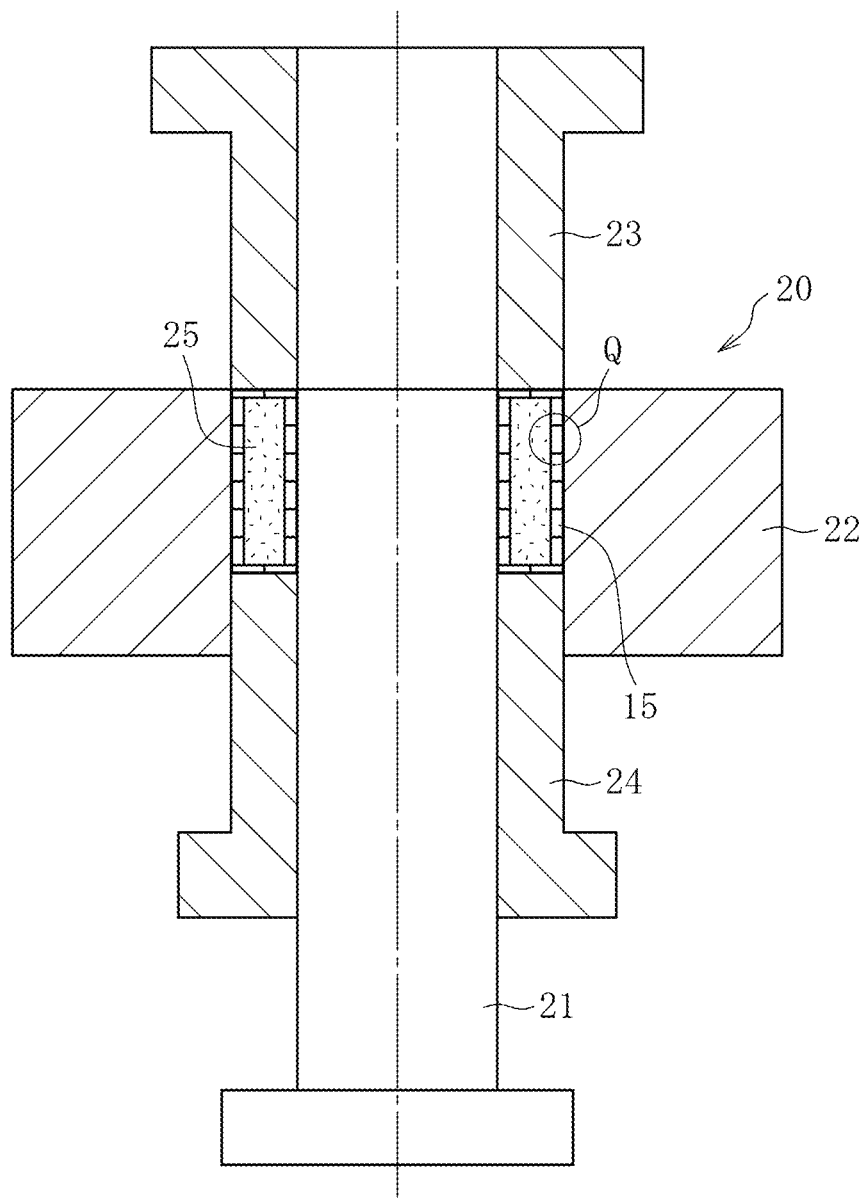
FIG. 8 is a sectional view for illustrating a step of molding a green compact through use of a mold.

The raw material powders obtained after the secondary mixing are fed to a mold 20 of a molding machine. As illustrated in FIG. 8, the mold 20 is constructed of a core 21, a die 22, an upper punch 23, and a lower punch 24, and the raw material powders are loaded into a cavity defined by those components of the mold 20. When the upper and lower punches 23 and 24 are brought close to each other to compress the raw material powders, the raw material powders are molded by a molding surface defined by an outer peripheral surface of the core 21, an inner peripheral surface of the die 22, an end surface of the upper punch 23, and an end surface of the lower punch 24, to thereby obtain a cylindrical green compact 25.

Among the metal powders of the raw material powders, the flat copper powder has the lowest apparent density. Further, the flat copper powder has a foil-like shape with the above-mentioned length L and thickness t, and its wider surface has a large area per unit weight. Therefore, the flat copper powder 15 is easily affected by the adhesion force that is generated due to the fluid lubricant adhering onto the surface of the flat copper powder, and further by the Coulomb force or the like. After loading the raw material powders into the mold 20, as illustrated in an enlarged manner in FIG. 9 (enlarged view of the region Q in FIG. 8), the flat copper powder 15 is caused to adhere to the entire region of a molding surface 20a of the mold 20 with its wider surface opposed to the molding surface 20a under a layered state in which a plurality of layers (approximately one to three layers) of the flat copper powder 15 are superimposed. At this time, flake graphite adhering to the flat copper powder 15 is also caused to adhere onto the molding surface 20a of the mold together with the flat copper powder 15 (illustration of graphite is omitted in FIG. 9).

Meanwhile, in an inner region of the layered structure of the flat copper powder 15 (region close to the center of the cavity), the partially diffusion-alloyed powder 11, the flat copper powder 15, a low-melting point metal powder 16, and the graphite powder are brought into a state of being dispersed uniformly as a whole. This inner region contains, as copper powders, the copper powder 13 diffused in and bonded to the iron powder 12 of the partially diffusion-alloyed powder 11, the flat copper powder 15, and a granular elemental copper powder 13' that has escaped from the partially diffusion-alloyed powder 11 at the time of the classification. In the green compact 25 obtained after the molding, the distribution state of those powders is maintained substantially as it is.

[Sintering]

After that, the green compact 25 is sintered in a sintering furnace. In this embodiment, the sintering conditions are determined so that an iron structure becomes a two-phase structure containing a ferrite phase and a pearlite phase. When the iron structure is formed of the two-phase structure containing a ferrite phase and a pearlite phase, the hard pearlite phase contributes to improvement in wear resistance, and the wear of the bearing surface is suppressed under high surface pressure. As a result, the life of the bearing can be prolonged.

When the presence ratio of pearlite (γFe) becomes excessively high through diffusion of carbon to reach a ratio comparable to or higher than that of ferrite (αFe), the aggressiveness to the shaft due to pearlite is increased significantly, and hence the shaft is liable to be worn. In order to prevent this phenomenon, the amount of the pearlite phase (γFe) is suppressed to the extent that the pearlite phase (γFe) is present (in a scattered manner) at a grain boundary of the ferrite phase (αFe) (see FIG. 11). The "grain boundary" herein refers to not only a grain boundary formed between powder grains but also a crystal grain boundary 18 formed in the powder grains. When the iron structure is formed of the two-phase structure containing a ferrite phase (αFe) and a pearlite phase (γFe) as described above, the ratio between the ferrite phase (αFe) and the pearlite phase (γFe) in the iron structure, in terms of an area ratio in an arbitrary cross section of a base part S2 described below, is desirably approximately as follows: αFe:γFe=80%-95%:5%-20%. With this, a balance between suppression of the wear of the shaft 2 and improvement in wear resistance of the bearing surface 1a can be achieved.

The growth rate of pearlite mainly depends on a sintering temperature. Thus, it order that the pearlite phase be present at the grain boundary of the ferrite phase in the above-mentioned manner, the sintering is performed at a sintering temperature (furnace atmosphere temperature) of from about 820° C. to about 900° C. through use of a gas containing carbon, such as a natural gas or an endothermic gas (RX gas), as a furnace atmosphere. With this, carbon contained in the gas diffuses into iron at the time of sintering, with the result that the pearlite phase (γFe) can be formed. Sintering at a temperature higher than 900° C. is not preferred because, through such sintering, carbon in the graphite powder reacts with iron, with the result that the pearlite phase increases more than necessary. Along with the sintering, the fluid lubricant, other lubricants, and various molding aids described above burn in the inside of the sintered compact, or evaporate from the inside of the sintered compact.

Through the above-mentioned sintering step, a porous sintered compact is obtained. Sizing is carried out on this sintered compact, and a lubricating oil or liquid grease is further impregnated into the sintered compact by a method involving vacuum pressure impregnation or the like, to thereby complete the sintered bearing 1 (oil-impregnated sintered bearing) illustrated in FIG. 1. The lubricating oil impregnated into the sintered compact is retained not only in pores formed between grains in sintered structures but also in pores in the reduced iron powder in the partially diffusion-alloyed powder. The lubricating oil to be impregnated into the sintered compact preferably has a kinematic viscosity at 40° C. of 30 mm$^2$/sec or more and 200 mm$^2$/sec or less. Depending on applications, the step of impregnating a lubricating oil may be omitted so that the sintered bearing 1 is used under an oil-less condition.

Figure 10:
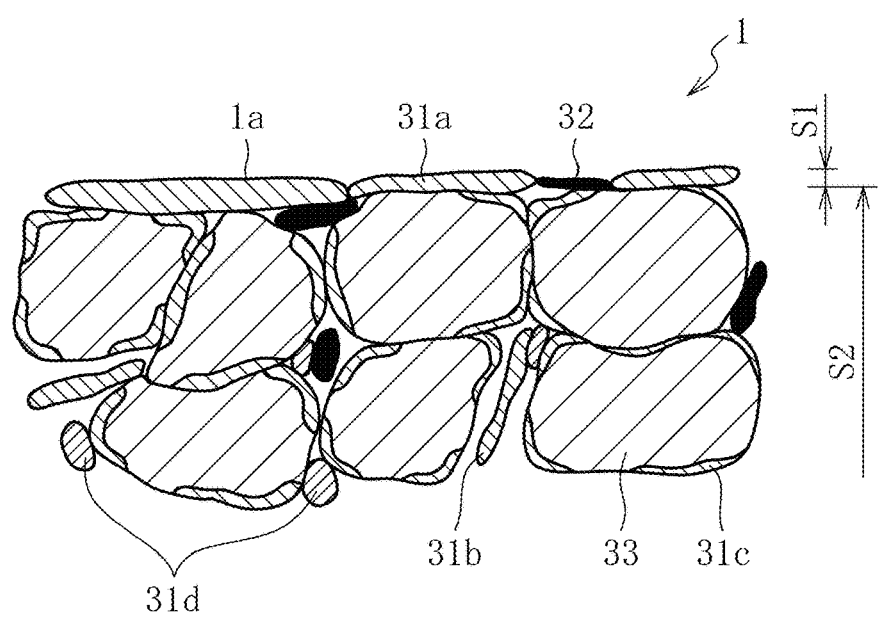
FIG. 10 is an enlarged view of the sintered bearing (region P in FIG. 1) in a cross section in a radial direction.

A microscopic structure of the sintered bearing 1 after the above-mentioned manufacturing steps in the vicinity of its surface (region P in FIG. 1) is schematically illustrated in FIG. 10.

As illustrated in FIG. 10, in the sintered bearing 1 of the present invention, the green compact 25 is formed under a state in which the flat copper powder 15 is caused to adhere in a layered shape to the molding surface 20a (see FIG. 8). Further, deriving from the fact that such flat copper powder 15 is sintered, a surface layer S1 having a concentration of copper higher than those in other portions is formed in the entire surface of the bearing 1 including the bearing surface 1a. Besides, the wider surface of the flat copper powder 15 is caused to adhere onto the molding surface 20a, and hence many of copper structures 31a of the surface layer S1 have such a flat shape that each copper structure 31a is thinned in a thickness direction of the surface layer S1 (i.e., arranged substantially parallel to a surface (bearing surface 1a)). The thickness of the surface layer S1 corresponds to the thickness of a layer of the flat copper powder adhering in a layered shape to the molding surface 20a, and is approximately from about 1 μm to about 6 μm. The surface of the surface layer S1 is formed mainly of free graphite 32 (represented by solid black) in addition to the copper structure 31a, and the rest is formed of openings of pores and an iron structure described below. Of those, the copper structure 31a has the largest area, and specifically, the copper structure 31a occupies an area of 60% or more of the surface.

Meanwhile, in a base part S2 which is covered with the surface layer S1 and located inside, three kinds of copper structures (31b, 31c, 31d), an iron structure 33, free graphite 32, and pores are formed. The third copper structure 31b is formed resulting from the flat copper powder 15 in the inside of the green compact 25, and has a flat shape corresponding to the flat copper powder. The first copper structure 31c is formed resulting from the copper powder 13 bonded to the iron powder 12 of the partially diffusion-alloyed powder 11, and is firmly diffused in and bonded to the iron structure 33. The first copper structure 31c plays a role in increasing a bonding force between grains as described below.

In addition, the second copper structure 31d is formed resulting from the granular elemental copper powder 13' having a grain diameter of 45 μm or less (i.e., elemental copper powder that has escaped from the partially diffusion-alloyed powder 11 at the time of the classification), and adheres to the iron structure 33 and the other copper structures 31b, 31c. The second copper structure 31d may be partially diffused in and bonded to the iron powder 12 by sintering, but has a small alloy-forming region (diffusion region) with the iron structure 33 as compared to the second copper structure 31c derived from the copper powder 13 diffused in and bonded to the iron powder 12 in advance. In addition, the second copper structure 31d assumes a nearly granular shape quite unlike the shape of the first copper structure 31b having a flat shape derived from the flat copper powder. Therefore, when the copper structure of the base part S2 has a small alloy-forming region with the iron structure 33 and assumes an approximately granular shape, the copper structure can be determined to be the second copper structure 31d derived from the elemental copper powder 13' that has escaped from the partially diffusion-alloyed powder 11.

In this embodiment, elemental copper powder is not separately added to the raw material powders. However, also when such elemental copper powder is added, observation of a structure after sintering can determine whether or not the copper structure is derived from the elemental copper powder that has escaped from the partially diffusion-alloyed powder. That is, the grain diameter of the elemental copper powder to be added to the raw material powders is generally at least more than 45 μm, and in many cases, is more than 80 μm. Meanwhile, the grain diameter of the elemental copper powder that has escaped from the partially diffusion-alloyed powder is at least 45 μm or less, generally about 20 μm. Therefore, the copper structure derived from the elemental copper powder that has escaped from the partially diffusion-alloyed powder, and the copper structure derived from the elemental copper powder separately added to the raw material powders clearly differ from each other in their sizes. Specifically, in an arbitrary cross section of the base part S2, when the grain diameter of the elemental copper powder forming the copper structure is 45 μm or less, the copper structure can be determined to have been derived from the elemental copper powder that has escaped from the partially diffusion-alloyed powder, and when the grain diameter of the elemental copper powder forming the copper structure is more than 45 μm, the copper structure can be determined to have been derived from the elemental copper powder separately added to the raw material powders.

Figure 11:
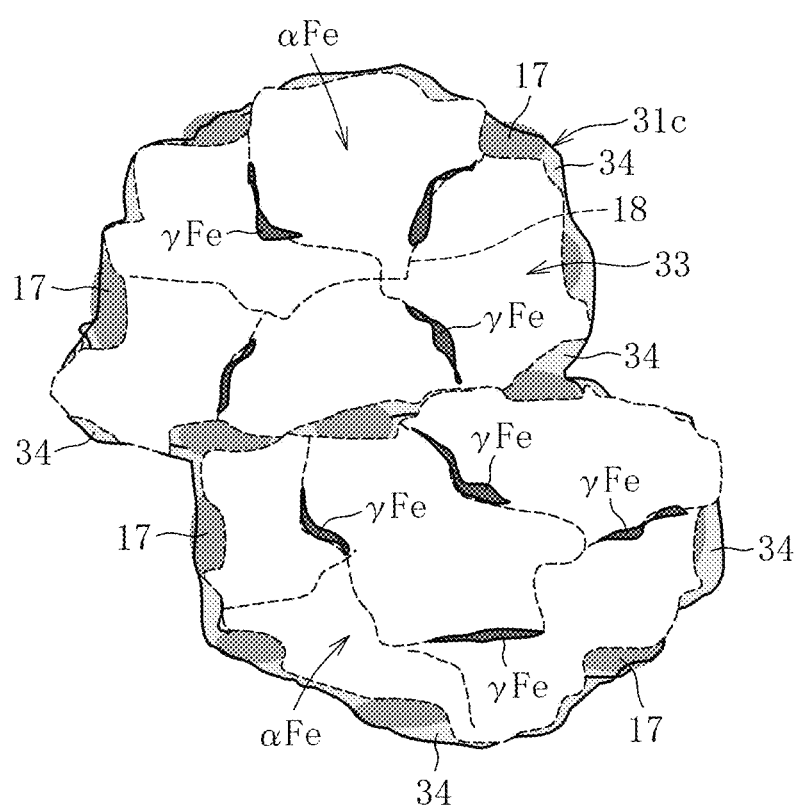
FIG. 11 is an enlarged view for illustrating an iron structure and its surrounding structures of FIG. 10.

FIG. 11 is an enlarged illustration of the iron structure 33 and its surrounding structures after the sintering illustrated in FIG. 10. As illustrated in FIG. 11, tin serving as the low-melting point metal (low-melting point substance) melts first at the time of sintering to diffuse into the copper powder 13 constituting the partially diffusion-alloyed powder 11 (see FIG. 4), and thus forms a bronze phase 34 (Cu—Sn). Diffusion into iron grains or other copper grains progresses through the bronze phase 34, with the result that the iron grains and the copper grains, or the respective copper grains are firmly bonded to each other. In addition, in the individual partially diffusion-alloyed powder 11, molten tin diffuses also into a portion in which part of the copper powder 13 diffuses to form an Fe—Cu alloy, and thus forms an Fe—Cu—Sn alloy (alloy phase 17). The bronze phase 34 and the alloy phase 17 form the second copper structure 31c in combination. As described above, part of the second copper structure 31c diffuses into the iron structure 33, and hence high neck strength can be obtained between the second copper structure 31c and the iron structure 33. In FIG. 11, the ferrite phase (αFe), the pearlite phase (γFe), and the like are represented by shading. Specifically, the ferrite phase (αFe), the bronze phase 34, the alloy phase 17 (Fe—Cu—Sn alloy), and the pearlite phase (γFe) are shaded with increasing darkness in the stated order.

Figure 12A:
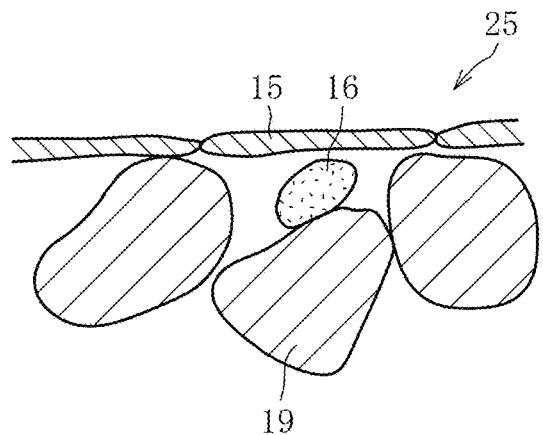
FIG. 12A is an enlarged view for illustrating flat copper powder before sintering.

When a general iron powder 19 is used instead of the partially diffusion-alloyed powder 11, as illustrated in FIG. 12A, part of the low-melting point metal powder 16 is present between the flat copper powder 15 and the general iron powder 19. When sintering is performed under such state, there arises a so-called spheroidization problem of the flat copper powder 15, in which the flat copper powder 15 is drawn by the low-melting point metal powder 16 through surface tension of the molten low-melting point metal powder 16 and rounded around the low-melting point metal powder 16 as a core. When the flat copper powder 15 is left spheroidized, the area of the copper structure 31a in the surface layer S1 is reduced (see FIG. 10), resulting in a large influence on the sliding characteristics of the bearing surface 1a.

Figure 13:
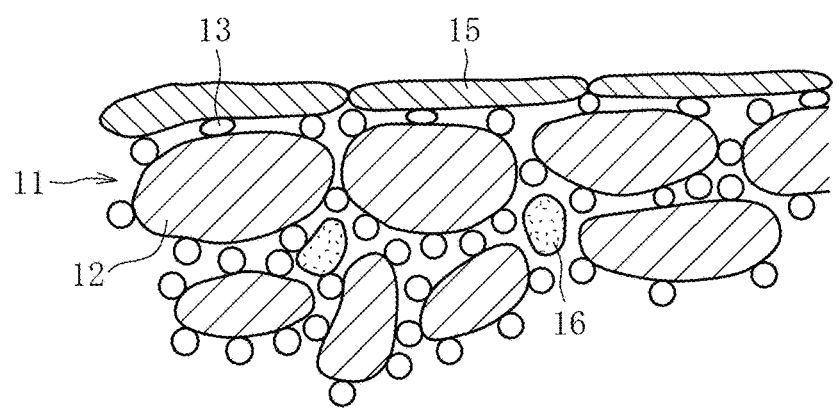
FIG. 13 is an enlarged view for conceptually illustrating the structures of a green compact of the present invention before the sintering.

In contrast, in the present invention, as illustrated in FIG. 13, the partially diffusion-alloyed powder 11 in which almost the entire periphery of the iron powder 12 is covered with the copper powder 13 is used as the raw material powder, and hence a number of grains of the copper powder 13 are present around the low-melting point metal powder 16. In this case, the low-melting point metal powder 16 melting along with sintering diffuses into the copper powder 13 of the partially diffusion-alloyed powder 11 ahead of the flat copper powder 15. In particular, in an initial stage of sintering, this phenomenon is promoted because of the fluid lubricant remaining on the surface of the flat copper powder 15. With this, an influence of the low-melting point metal powder 16 on the flat copper powder 15 of the surface layer S1 can be suppressed (even when the low-melting point metal powder 16 is present just below the flat copper powder 15, surface tension acting on the flat copper powder 15 is reduced). Accordingly, the spheroidization of the flat copper powder 15 in the surface layer can be suppressed, the ratio of the copper structure in the surface of the bearing including the bearing surface 1a is increased, and good sliding characteristics can be obtained. In order to exploit the above-mentioned feature, it is preferred to add the least amount possible of elemental iron powder to the raw material powders. That is, it is preferred that the iron structure 33 be entirely derived from the partially diffusion-alloyed powder.

As described above, in the present invention, the spheroidization of the flat copper powder 15 in the surface layer S1 can be avoided, and hence the blending ratio of the low-melting point metal powder 16 can be increased in the bearing. That is, while it is existing common general technical knowledge that the blending ratio of the low-melting point metal powder 16 needs to be suppressed to less than 10 mass % with respect to the flat copper powder 15 in order to suppress the spheroidization influence on the flat copper powder 15, the ratio can be increased to from 10 mass % to 30 mass % according to the present invention. In addition, the blending ratio of the low-melting point metal powder 16 is set to from 5 mass % to 10 mass % with respect to all copper in the bearing. Such increase in blending ratio of the low-melting point metal powder 16 leads to a further increase in effect of promoting the diffusion of the copper powder into the iron powder, and hence is more effective for an increase in strength of the sintered bearing 1.

With the above-mentioned configuration, in the entire surface of the surface layer S1 including the bearing surface 1a, the area ratio of the copper structure to the iron structure can be 60% or more, and the copper-rich bearing surface 1a less susceptible to oxidation can be stably obtained. In addition, even when the surface layer S1 is worn, the copper structure 31c derived from the copper powder 13 adhering onto the partially diffusion-alloyed powder 11 is exposed on the bearing surface 1a. Therefore, even when the sintered bearing 1 is used for the vibration motor, the fretting wear of the bearing surface 1a can be prevented. In addition, the sliding characteristics of the bearing surface 1a including an initial running-in property and quietness can also be improved.

Meanwhile, the base part S2 located inside the surface layer S1 is a hard structure having a small content of copper and a large content of iron as compared to the surface layer S1. Specifically, the base part S2 has the largest content of Fe, and a content of Cu of from 20 mass % to 40 mass %. As described above, the base part S2 occupying most of the bearing 1 has a large content of iron, and hence the usage amount of copper in the entire bearing 1 can be reduced, with the result that low cost can be achieved. In addition, the strength of the entire bearing can be enhanced by virtue of the large content of iron.

In particular, in this embodiment, high neck strength is obtained between the copper structure 31c and the iron structure 33 derived from the partially diffusion-alloyed powder 11. With this, the copper structure and the iron structure are prevented from escaping from the bearing surface 1a, and the wear resistance of the bearing surface can be improved. In addition, the strength (specifically, radial crushing strength) of the bearing can be enhanced. Therefore, as illustrated in FIG. 2, even when the sintered bearing 1 is press-fitted and fixed to the inner periphery of the housing 3, the bearing surface 1a does not deform in accordance with the shape of the inner peripheral surface of the housing 3, and the circularity, cylindricity, and the like of the bearing surface 1a can be stably maintained after mounting. Accordingly, after the sintered bearing 1 is press-fitted and fixed to the inner periphery of the housing 3, a desired circularity (for example, a circularity of 3 μm or less) can be secured without additional processing for finishing the bearing surface 1a into an appropriate shape with appropriate accuracy (for example, sizing). In addition, even when the shaft 2 is brought into contact with the bearing surface 1a, the deformation of the bearing surface 1a can be prevented.

Further, in the present invention, the sieve having a relatively large opening is used in the classification of the partially diffusion-alloyed powder 11 so that the ratio of the elemental copper powder contained in the partially diffusion-alloyed powder 11 after the classification may be 10 mass % or less. With this, the ratio of the elemental copper powder unintentionally incorporated into the raw material powders is reduced, and as a result, the ratio of the partially diffusion-alloyed powder in the raw material powders can be increased. Therefore, the strength of the sintered bearing can be enhanced. Specifically, a radial crushing strength of 350 MPa or more can be obtained.

In addition, the sintered bearing for a vibration motor to be mounted to a portable terminal as in this embodiment has an extremely small thickness (for example, 500 μm or less). Accordingly, when the grain diameter of the partially diffusion-alloyed powder is excessively large, molding accuracy may be difficult to secure. Therefore, the grain diameter of the partially diffusion-alloyed powder is preferably equal to or less than ½ of the minimum thickness of the sintered bearing, and is more preferably set to be equal to or less than ⅓ of the minimum thickness. Within a range in which such condition is satisfied, through use of the partially diffusion-alloyed powder classified with the sieve having a relatively large opening on the basis of the above-mentioned finding, the strength of the sintered bearing can be enhanced.

Besides, free graphite is precipitated on the entire surface including the bearing surface 1a, and further flake graphite is caused to adhere onto the molding surface 20a in the form in which the flake graphite accompanies the flat copper powder 15. Therefore, the content ratio of graphite in the surface layer S1 is higher than that in the base part S2. As a result, the friction of the bearing surface 1a can be reduced, and the durability of the bearing 1 can be increased.

Now, other embodiments of the present invention are described. The description focuses on differences from the above-mentioned embodiment, and overlapping description regarding configurations similar to those of the above-mentioned embodiment is omitted.

In the sintered bearing according to the first embodiment described above, there is described a case in which the flat copper powder is blended into the raw material powders to form the surface layer in which the ratio of copper is higher than that in the base part S2. However, raw material powders containing no flat copper powder and containing as main components the Cu—Fe partially diffusion-alloyed powder, the low-melting point metal powder, and the solid lubricant may be used. In this case, the sintered bearing has a roughly uniform composition across its entirety. Also in this sintered bearing, as in the above-mentioned embodiment, the partially diffusion-alloyed powder classified with the sieve having a relatively large opening is used, and hence the copper structure formed of the granular elemental copper powder having a grain diameter of 45 μm or less (copper powder that has escaped from the partially diffusion-alloyed powder) is set to 10 mass % or less. That is, at least in the inside of the sintered bearing of the present invention (for example, at a depth of 10 μm or more from the surface), most part (for example, 85 mass % or more) of the copper structure is formed resulting from the partially diffusion-alloyed powder irrespective of the presence or absence of the surface layer S1 formed of the flat copper powder.

In addition, in the first embodiment described above, the iron structure is formed of the two-phase structure including a ferrite phase and a pearlite phase. However, there is a risk in that the pearlite phase (γFe), which has a hard structure (HV 300 or more) and hence has high aggressiveness to a mating member, allows progression of the wear of the shaft 2 depending on the use conditions of the bearing. In order to eliminate such risk, the entire iron structure 33 may be formed of the ferrite phase (αFe).

In order to form the entire iron structure 33 of the ferrite phase as described above, a sintering atmosphere is set to a gas atmosphere not containing carbon (hydrogen gas, nitrogen gas, argon gas, or the like) or a vacuum atmosphere. With such measure, a reaction between carbon and iron does not occur in the raw material powders. Accordingly, the iron structure after sintering is entirely formed of the soft ferrite phase (αFe) (HV 200 or less). With such configuration, even when the surface layer S1 is worn and the iron structure 33 of the base part S2 is exposed on the surface, the bearing surface 1a can be softened, and the aggressiveness to the shaft 2 can be reduced.

Figure 14:
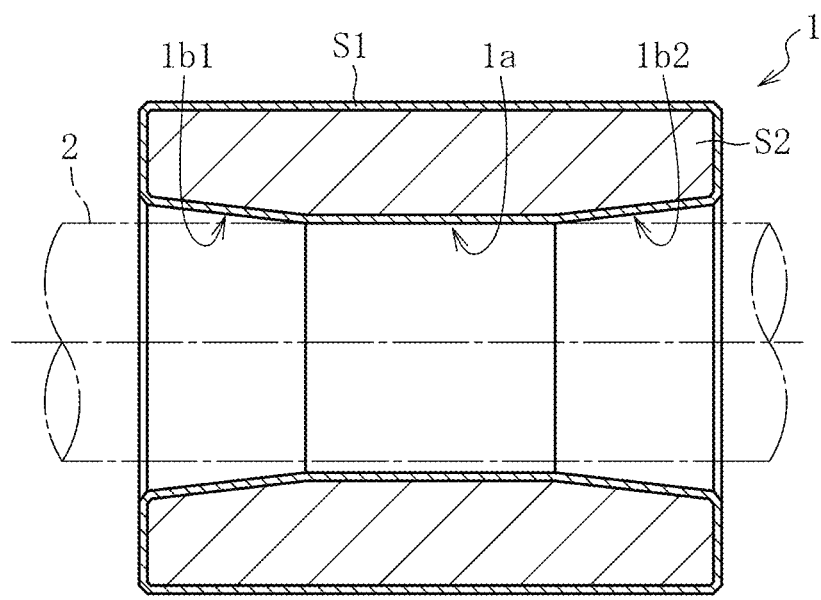
FIG. 14 is a sectional view for illustrating a sintered bearing according to another embodiment of the present invention.

In addition, as illustrated in FIG. 14, the bearing surface 1a, which is a cylindrical surface, of the sintered bearing 1 comprising the surface layer S1 and the base part S2 may have formed therein tapered surfaces 1b1, 1b2 in both sides thereof in an axial direction, the tapered surfaces 1b1, 1b2 each providing a larger diameter on an opening side. When the tapered surfaces 1b1, 1b2 are formed in both sides of the sintered bearing 1 in the axial direction, the outer peripheral surface of the shaft 2 is prevented from being brought into local abutment with an end portion of the sintered bearing 1 even when the shaft 2 is deflected, and local wear of the bearing surface 1a, a reduction in strength of the bearing, and generation of extraordinary noise due to stress concentration can be prevented.

Figure 12B:
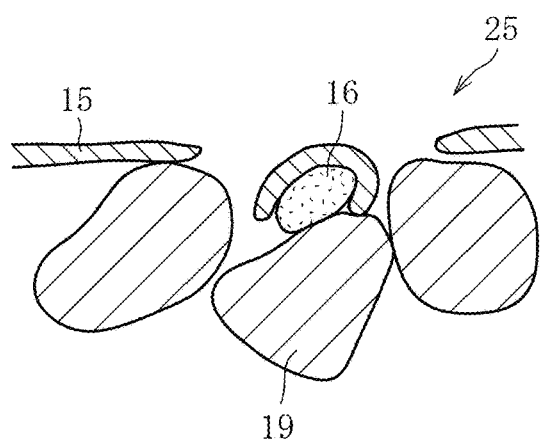
FIG. 12B is an enlarged view for illustrating spheroidized flat copper powder after the sintering.
Figure 15:
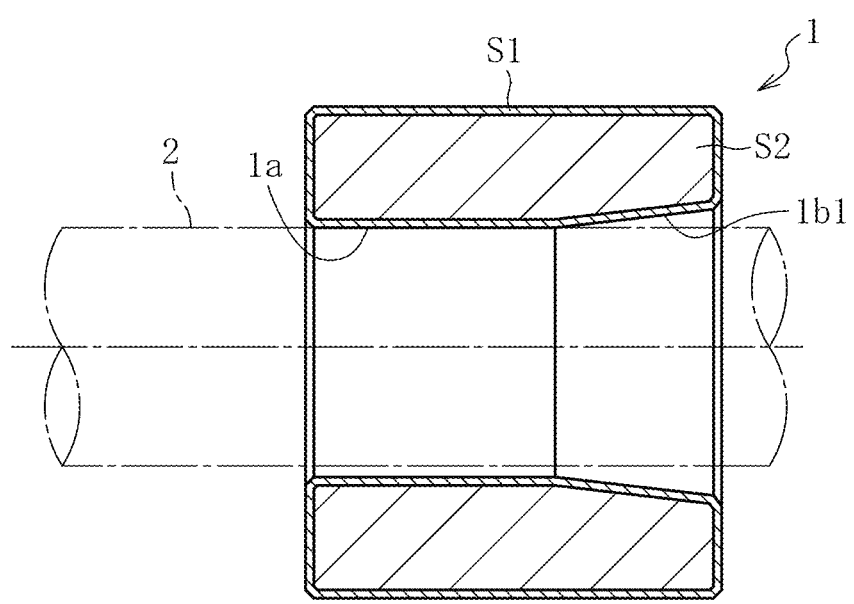
FIG. 15 is a sectional view for illustrating a sintered bearing according to still another embodiment of the present invention.

In addition, as illustrated in FIG. 15, the bearing surface 1a, which is a cylindrical surface, of the sintered bearing 1 may have formed therein the tapered surface 1b1 in only one side thereof in the axial direction, the tapered surface 1b1 providing a large diameter on the opening side. With such configuration, actions and effects similar to those in the embodiment illustrated in FIG. 12 can be obtained. The sintered bearing 1 illustrated in each of FIG. 14 and FIG. 15 may be used for, for example, a drive mechanism for an automobile power window or a drive mechanism for an automobile power seat.

Figure 16:
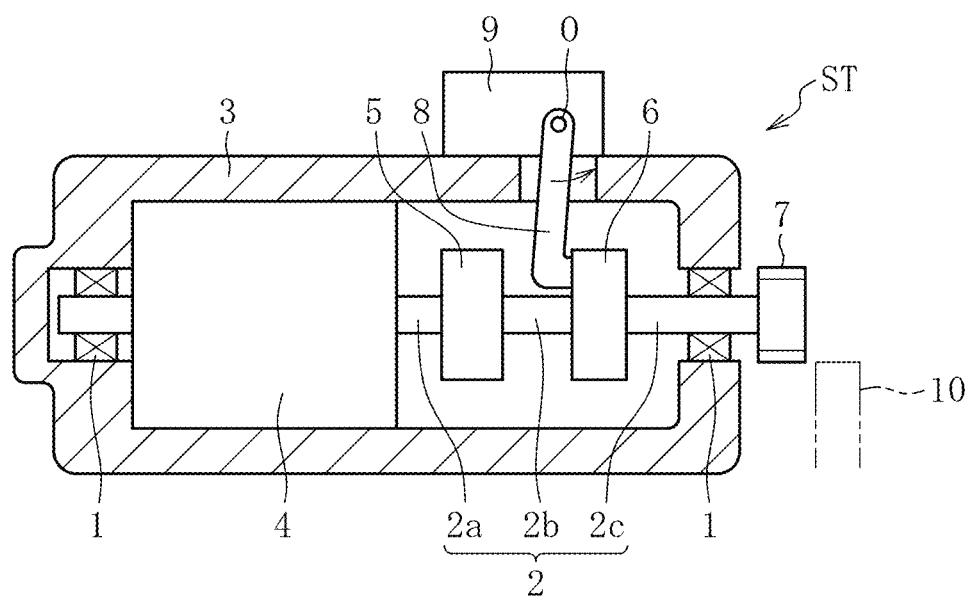
FIG. 16 is a sectional view for illustrating a typical configuration of a starter in a simplified manner.

The above-mentioned sintered bearing 1 may be applied not only to the vibration motor but also to, for example, a starter for an automobile. A typical configuration of a starter ST to be used for activating an engine for an automobile is illustrated in FIG. 16 in a simplified manner. The starter ST comprises as main constituent elements a housing 3, a motor part 4 comprising a motor shaft 2a, a reduction gear 5 comprising an output shaft 2b, an overrunning clutch 6 comprising an output shaft 2c, a pinion gear 7, a shift lever 8, and an electromagnetic switch 9. The shift lever 8 is rotatable about a pivot point O, and its tip is arranged in the back of the overrunning clutch 6 (input side). The overrunning clutch 6 is a one-way clutch, and the output shaft 2b of the reduction gear 5 is connected thereto on the input side so as to be slidable in an axial direction through a spline or the like. The pinion gear 7 is mounted to the output shaft 2c of the overrunning clutch 6, and the overrunning clutch 6 is movable in the axial direction integrally with the output shaft 2c and the pinion gear 7.

When ignition is turned on, the motor part 4 is driven, and the torque of the motor shaft 2a is transmitted to the pinion gear 7 through the reduction gear 5 and the overrunning clutch 6. In addition, the electromagnetic switch 9 is turned on to provide torque in a direction indicated by the arrow of the figure to the shift lever 8, and the overrunning clutch 6 and the pinion gear 7 integrally move forward. With this, the pinion gear 7 is engaged with a ring gear 10 connected to a crankshaft, and the torque of the motor part 4 is transmitted to the crankshaft to activate an engine. After the activation of the engine, the electromagnetic switch 9 is turned off, the overrunning clutch 6 and the pinion gear 7 move backward, and the pinion gear 7 separates from the ring gear 10. The torque of the engine immediately after its activation is not transmitted to the motor part 4 because the torque is shut off through the overrunning clutch 6.

The sintered bearing 1 of the present invention is press-fitted and fixed to the inner periphery of the housing 3 or the like in the starter ST described above, and is configured to support various shafts 2 (2a to 2c) in the starter ST (illustrated in FIG. 16 is the case where the sintered bearing 1 is configured to support the motor shaft 2a and the output shaft 2c of the overrunning clutch 6). The sintered bearing 1 may be used for supporting a gear of the reduction gear 5, while detailed illustration is omitted. For example, when the reduction gear 5 has a planetary gear mechanism, the sintered bearing 1 of the present invention is press-fitted to the inner periphery of a planetary gear configured to rotate with respect to a shaft, and thus the planetary gear can be supported so as to be rotatable with respect to the shaft.

In addition, through addition of any one or both of elemental iron powder and elemental copper powder to the raw material powders, the ratio of each of the iron structure and the copper structure in the sintered bearing can be freely changed. However, from the viewpoint of enhancing strength, it is preferred that the iron structure and the copper structure in the sintered bearing be formed of the partially diffusion-alloyed powder as much as possible without blending the elemental iron powder or the elemental copper powder.

In the above description, there is exemplified a case in which the present invention is applied to a cylindrical bearing having the bearing surface 1a formed into a perfect circle shape. However, the present invention is not limited to the cylindrical bearing, and is similarly applicable to a fluid dynamic bearing having dynamic pressure generating portions, such as herringbone grooves and spiral grooves, formed in the bearing surface 1a or the outer peripheral surface of the shaft 2. In addition, the case in which the shaft 2 is configured to rotate is described in this embodiment, but the present invention is applicable to an opposite application in which the bearing 1 is configured to rotate. Further, there are exemplified a vibration motor to be used for a portable terminal, a starter for an automobile, and the like as applications, but the applications of the sintered bearing 1 according to the present invention are not limited to those applications. The sintered bearing 1 according to the present invention is applicable to a wide range of other applications in addition to the exemplified ones.

In addition, at the time of compression molding of the green compact 25, there may be adopted a so-called warm molding method involving compression-molding the green compact 25 under the state in which at least one of the mold 20 or the raw material powders are heated or a molding method with mold lubrication involving compression-molding the green compact 25 under the state in which a lubricant is applied onto a molding surface of the mold 20. The green compact 25 can be molded with higher accuracy by adopting such methods.

Example 1

In order to confirm the effect of the present invention, the following tests were performed.

Cylindrical test pieces (Comparative Example, and Examples 1 to 4) were produced using mixed powders containing as main components Cu—Fe partially diffusion-alloyed powder, flat copper powder, tin powder, and graphite powder. The specifications of each test piece are shown in Table 1 below.

TABLE 1

| | Component mass % | | | | Physical properties | | |
| | | | | | Density | Radial crushing strength | |
| Item | Cu | Fe | Sn | C | g/cm$^3$ | MPa | Remark |
| Comparative Example | 25 to 40 | Balance | 1 to 2 | 0.3 to 0.6 | 6.8 | 300 | Small grain size of iron powder |
| Example 1 | 25 to 40 | Balance | 1 to 2 | 0.3 to 0.6 | 7.1 | 380 | Large grain size of iron powder |
| Example 2 | 25 to 40 | Balance | 1 to 2 | 0.3 to 0.6 | 7.0 | 460 | Increased amount of elemental iron powder Large grain size of iron powder |
| Example 3 | 25 to 40 | Balance | 2 to 3 | 0.3 to 0.6 | 7.1 | 550 | Large grain size of iron powder Increased amount of tin |

TABLE 1-continued

| | Component mass % | | | | Density | Radial crushing strength | |
|---|---|---|---|---|---|---|---|
| Item | Cu | Fe | Sn | C | g/cm³ | MPa | Remark |
| Example 4 | 25 to 40 | Balance | 2 to 3 | 0.3 to 0.6 | 7.1 | 700 | Large grain size of iron powder Increased amount of tin High sintering temperature |

As the Cu—Fe partially diffusion-alloyed powder, two kinds having different grain diameters were prepared. Specifically, Cu—Fe partially diffusion-alloyed powder classified using a sieve of 145 mesh (opening: 106 μm), and Cu—Fe partially diffusion-alloyed powder classified using a sieve of 100 mesh (opening: 150 μm) were prepared.

In Comparative Example, the partially diffusion-alloyed powder classified using a sieve of 145 mesh was used, and in each of Examples 1 to 4, the partially diffusion-alloyed powder classified using a sieve of 100 mesh was used. The test piece of Example 2 was produced using raw material powders further containing elemental iron powder in addition to those of Example 1. The test piece of Example 3 was produced using raw material powders in which the amount of the tin powder was further increased as compared to Example 1. In Example 4, the sintering temperature was set to be higher than those of Examples 1 to 3, specifically 910° C. or more.

As a result, as shown in Table 1, it was confirmed that, as compared to Comparative Example using the partially diffusion-alloyed powder having a small grain diameter, in each of Examples 1 to 4 using the partially diffusion-alloyed powder having a large grain diameter, the radial crushing strength was higher, specifically 350 MPa or more. This is presumably because the increase in the opening of the sieve reduced elemental copper powder that escaped from the partially diffusion-alloyed powder, to thereby increase the ratio of the partially diffusion-alloyed powder in the sintered bearing.

In addition, it was confirmed that, when the ratio of the tin powder was increased as in Examples 3 and 4, the radial crushing strength further increased as compared to the case in which the ratio of the iron powder was increased as in Example 2. Further, it was confirmed that, when the sintering temperature was set to 910° C. or more as in Example 4, the radial crushing strength greatly increased as compared to the case in which the sintering temperature was set to less than 910° C. as in Examples 1 to 3.

Figure 17:
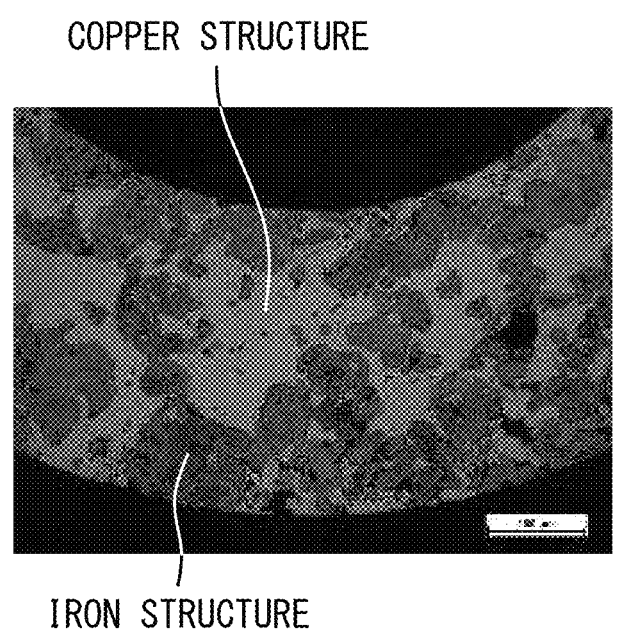
FIG. 17 is a cross-sectional photograph of a test piece according to Comparative Example shown in Table 1.
Figure 18:
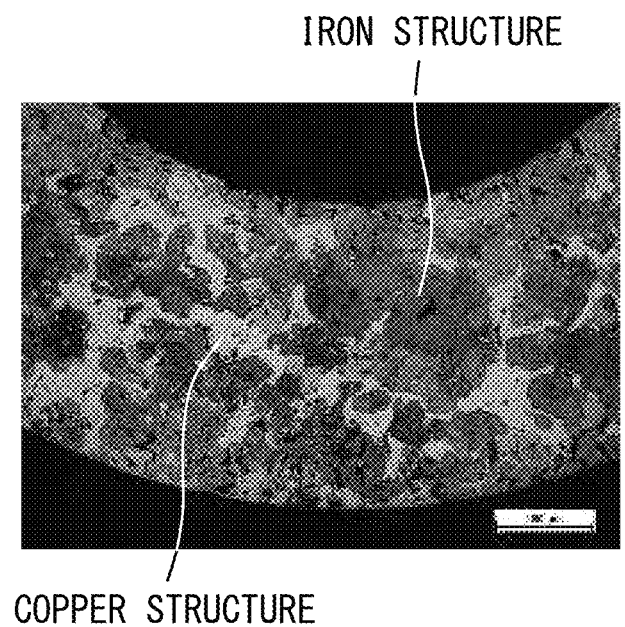
FIG. 18 is a cross-sectional photograph of a test piece according to Example 3 shown in Table 1.
Figure 19:
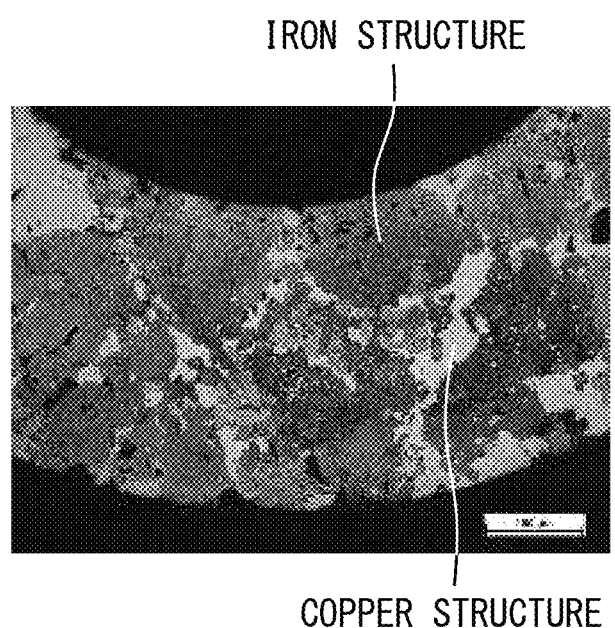
FIG. 19 is a cross-sectional photograph of a test piece according to Example 4 shown in Table 1.

FIG. 17 is a cross-sectional photograph of the test piece according to Comparative Example. FIG. 18 is a cross-sectional photograph of the test piece according to Example 3. FIG. 19 is a cross-sectional photograph of the test piece according to Example 4. In each photograph, a whitish region represents a copper structure, and a blackish region represents an iron structure. It can be seen from those photographs that the ratio of the copper structure is low in Examples shown in FIG. 18 and FIG. 19 as compared to Comparative Example shown in FIG. 17. This is presumably because the increase in the opening of the sieve reduced elemental copper powder that escaped from the partially diffusion-alloyed powder.

Figure 20:
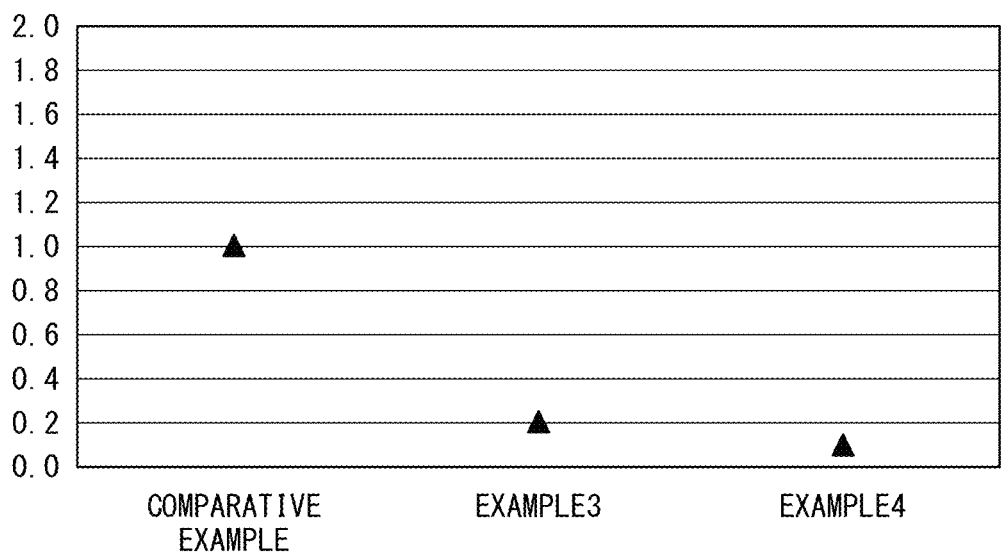
FIG. 20 is a graph for showing the amount of deformation in response to application of a predetermined load (30 N) to each test piece.
Figure 21:
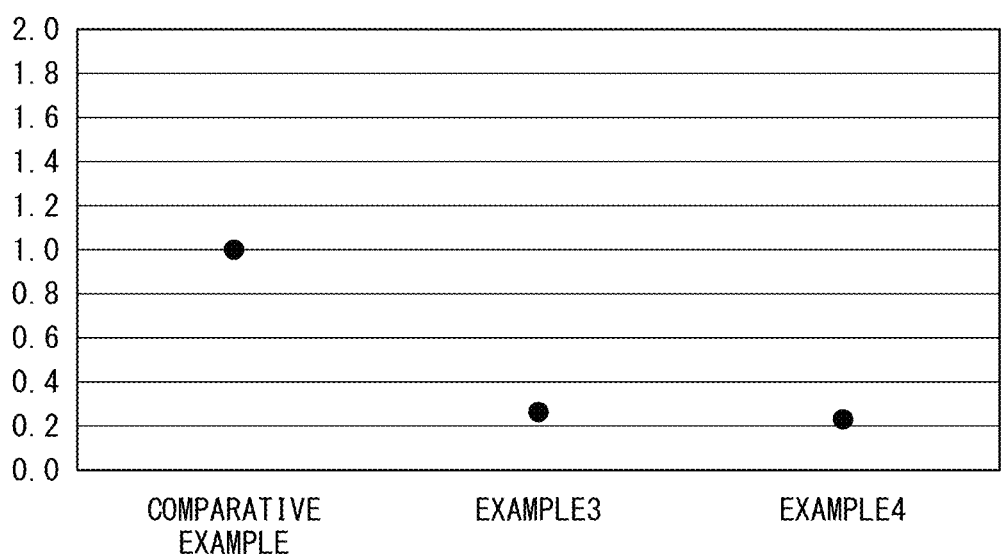
FIG. 21 is a graph for showing the amount of deformation in response to application of a predetermined load (50 N) to each test piece.

In addition, in FIG. 20 and FIG. 21, the amounts of deformation in response to application of predetermined loads (30 N in FIG. 20, 50 N in FIG. 21) to each test piece (Comparative Example 1, and Examples 1 and 2) are shown as ratios to the amounts of deformation of Comparative Example. It was confirmed from FIG. 20 and FIG. 21 that Examples using the partially diffusion-alloyed powder having a large grain diameter had smaller amounts of deformation as compared to Comparative Example using the partially diffusion-alloyed powder having a small grain diameter.

Figure 22:
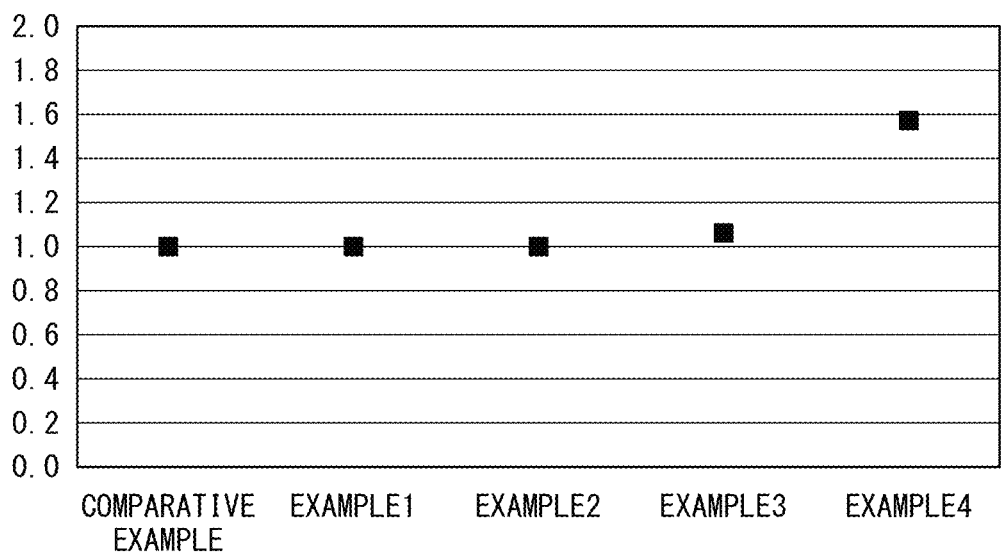
FIG. 22 is a graph for showing the apparent hardness of a copper structure of each test piece.
Figure 23:
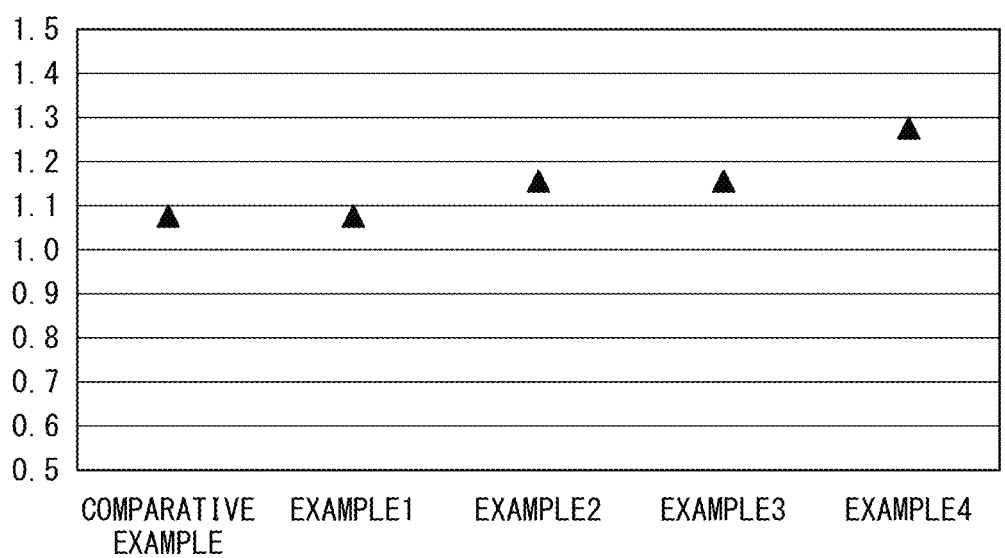
FIG. 23 is a graph for showing the apparent hardness of an iron structure of each test piece.

In addition, in FIG. 22, the ratio of the apparent hardness of the copper structure of each test piece is shown, and in FIG. 23, the ratio of the apparent hardness of the iron structure of each test piece is shown. It was confirmed from FIG. 22 and FIG. 23 that the hardnesses of the copper structure and the iron structure were higher in Example 4, in which the partially diffusion-alloyed powder having a large grain diameter was used and the sintering temperature was set to be more than 910° C.

As already described, many portable terminals, such as mobile terminals including mobile phones and smartphones, or wearable terminals, have a vibration function in order to make, for example, an incoming call or a mail notification, or a time notification. As a vibration device configured to generate vibration in a terminal main body, which is necessary for the vibration function, there is known a vibration device configured to generate vibration by supplying an alternating current to a driving coil arranged in a ferromagnetic field to drive a weight in an axial direction (axial direction drive type). In addition, there is also known a vibration device configured to generate vibration through rotation of a shaft having an eccentric weight mounted to a distal end thereof by a motor (rotary drive type) (see FIG. 2).

Figure 27A:
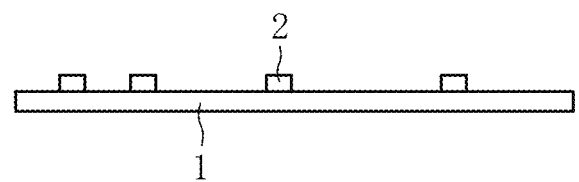
FIG. 27A is a schematic view for illustrating a reflow soldering step.
Figure 27B:
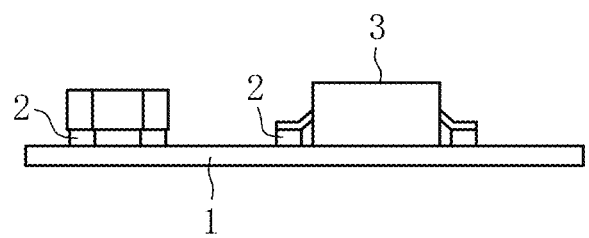
FIG. 27B is a schematic view for illustrating the reflow soldering step.
Figure 27C:
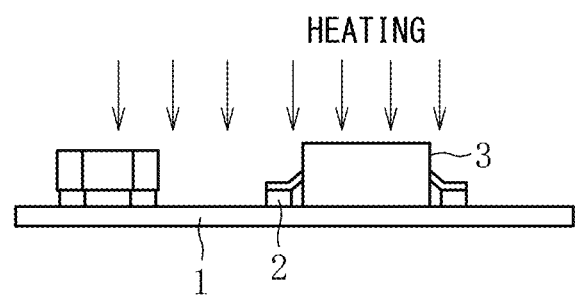
FIG. 27C is a schematic view for illustrating the reflow soldering step.

Irrespective of which vibration device is adopted, the vibration device itself is mounted to a circuit board. In recent years, the mounting has been performed by reflow soldering in many cases. In the reflow soldering, soldering is performed by: printing, as illustrated in FIG. 27A, a solder 2 in the form of a paste, which is called a cream solder, onto a circuit board 1 in accordance with a pattern; mounting, as illustrated in FIG. 27B, a vibration device 3 as well as an electronic component to the circuit board 1; and then melting, as illustrated in FIG. 27C, the solder 2 by supplying the circuit board 1 to a heating furnace. The heating of the circuit board 1 is generally performed in a batch furnace or a continuous furnace in which a furnace atmosphere temperature is retained at from about 220° C. to about 260° C. for about several seconds to about several tens of minutes.

A bearing is incorporated into the vibration device in order to support the reciprocating motion (axial direction drive type) or rotary motion (rotary drive type) of the shaft. As the bearing, in recent years, a sintered bearing obtained by impregnating a porous sintered compact with a lubricating oil has been used in many cases.

When the sintered bearing is used for the vibration device as described above, during the heating of the circuit board during the reflow soldering of the vibration device, the sintered bearing is also exposed to the above-mentioned high-temperature atmosphere. Consequently, the lubricating oil impregnated into the sintered bearing evaporates or the lubricating oil having a reduced viscosity flows out to the outside of the bearing. Accordingly, there is a risk in that the oil impregnation rate of the bearing may reduce to cause a reduction in life of the bearing. In order to suppress the evaporation and outflow of the lubricating oil, for example, it is conceivable that the sintered bearing is impregnated with a fluorine-based oil excellent in high temperature characteristics prepared so as to have a high viscosity. However, because of the high viscosity of the lubricating oil, there is a problem in that the frictional resistance of the sliding portion increases under a normal-temperature environment. In addition, the fluorine-based oil is expensive, and hence there is also a problem of a rise in manufacturing cost of the sintered bearing. Besides, particularly in the vibration device of the axial direction drive type, the lubricating oil that has seeped out onto the bearing surface is scraped out to the outside of the bearing owing to repeated reciprocating motion of the shaft, and hence there is also a problem of an increase in consumption of the lubricating oil.

In this case, in the device having incorporated therein the sintered bearing, it is desired that evaporation and outflow of the lubricating oil during temporary heating, for example, at the time of the mounting of the device be suppressed, and that the frictional resistance at the sliding portion during use of the device be reduced.

Now, an embodiment preferred for achieving the above-mentioned purpose is described.

Figure 24:
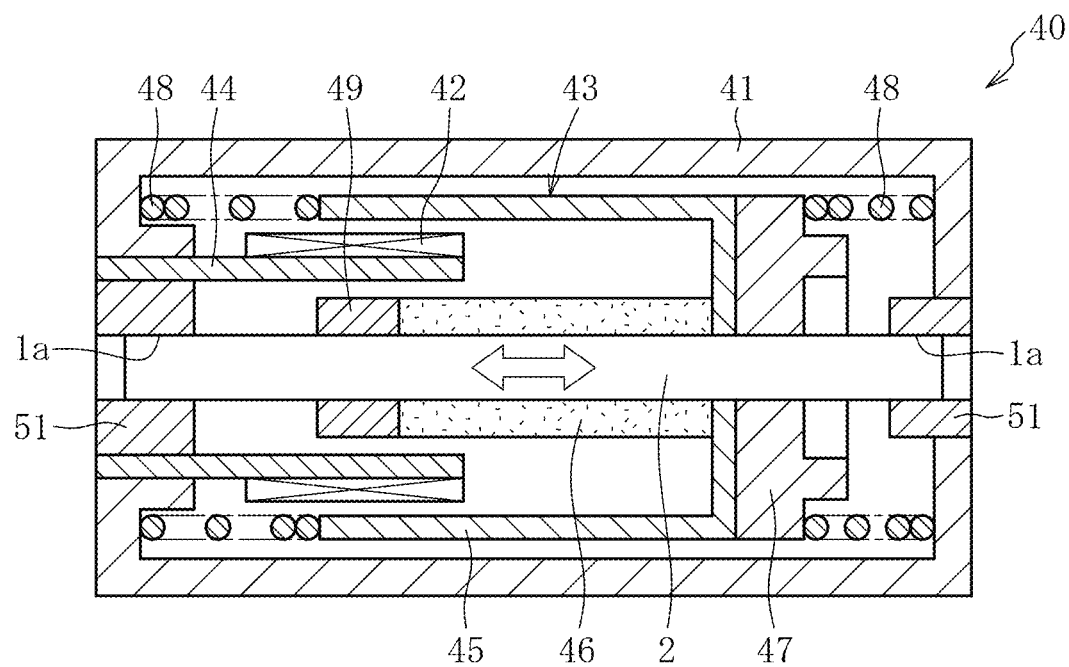
FIG. 24 is a sectional view for illustrating a vibration device of an axial direction drive type.

FIG. 24 is a sectional view for illustrating an example of a vibration device 40 of the axial direction drive type. As illustrated in FIG. 24, the vibration device 40 comprises as main constituent elements a housing 41, a driving coil 42, and a driver 43.

The housing 41 is formed of a resin or the like into a cylindrical shape opened at both ends. To the opening on one end side of the housing, a coil bobbin 44 is fixed in a cantilever state, and the driving coil 42 is formed on the outer periphery of the coil bobbin 44. The driver 43 includes: a cup-shaped yoke 45 formed of a magnetic material; a magnet 46 (permanent magnet) fixed in a cantilever state onto the inner bottom surface of the yoke 45; a weight 47 fixed onto the outer bottom surface of the yoke 45; and the shaft 2 inserted into and arranged on the inner periphery of the yoke 45. The yoke 45, the magnet 46, the weight 47, and the shaft 2 are integrally movable. Elastic members 48, for example, coil springs are arranged on both sides of the driver 43 in an axial direction, and the driver 43 is elastically supported by the elastic members 48 on both sides thereof in the axial direction with respect to the housing 41. The driver 43 is movable to both sides in the axial direction, and its reciprocating motion is supported by the inner peripheral surface 1a (bearing surface) of a sintered bearing 51 fixed to the inner peripheries of the openings at both ends of the housing 41.

A pole piece 49 formed of a magnetic material is fixed to the end surface of the magnet 46 on its free end side. There is formed a closed magnetic circuit in which a magnetic flux from the magnet 46 extends at the pole piece 49 in a diameter direction to intersect the driving coil 42, and further via the yoke 45, returns to the magnet 46. When an alternating current is applied to the driving coil 42 intersecting a line of magnetic force, forces pushing the driver 43 to one side and the other side in the axial direction are alternately generated in accordance with the direction of the current. As a result, the driver 43 moves in a reciprocating manner in the axial direction. The reciprocating motion of the driver 43 generates vibration.

The sintered bearing 51 is formed of a cylindrical sintered compact having the bearing surface 1a in its inner peripheral surface. As the sintered compact, in addition to a sintered compact of general composition for a sintered bearing (iron-based, copper-based, or copper-iron-based sintered compact), the sintered compact to be used in the sintered bearing 1 described with reference to FIG. 1 to FIG. 23, or a second sintered compact 1' to be described later may be used.

A sintered compact constituting a sintered bearing is generally impregnated with a lubricating oil. In contrast, the sintered bearing 51 of the present invention is formed by impregnating the sintered compact with grease. The grease is a lubricant obtained by dispersing a thickener in a base oil to achieve a semi-solid state or a solid state. In the present invention, the following are used as the base oil and the thickener.

[Base Oil]

As the base oil, a poly-α-olefin (Poly-Alpha-Olefins)-based synthetic lubricating oil (hereinafter referred to as PAO) is used. The PAO is, for example, a product obtained by: polymerizing (oligomerizing) only several molecules of a linear α-olefin (having 6 to 18 carbon atoms), which has been obtained by oligomerizing ethylene or thermally decomposing a wax, in a limited manner; and then subjecting the resultant to hydrogenation treatment to hydrogenate a terminal double bond thereof. The PAO is produced, for example, as described below.

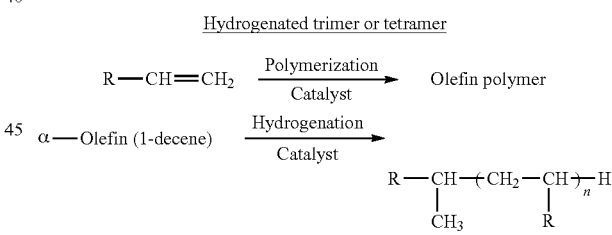

The PAO is a synthetic lubricating oil having uniform molecules free of an unsaturated double bond, which inhibits stability, and free of impurities, such as sulfur and nitrogen, and has the following feature: its molecular weight distribution is narrow, and hence its evaporation loss at high temperature is small. Therefore, in the mounting of the vibration device 40 to the circuit board, even when the vibration device 40 is heated in order to melt the reflow solder, the base oil is less liable to evaporate, and hence the oil impregnation amount of the sintered bearing 1' can be prevented from reducing. In addition, the PAO has a high viscosity index and a low pour point, and has a feature in that its use temperature region widely ranges from low temperature to high temperature. Therefore, the frictional resistance at the sliding portion between the shaft 2 and the bearing surface 1a can be reduced even during operation of the vibration device 40.

Commercially available PAOs come in a plurality of grades different from each other in kinematic viscosity at 40° C. and kinematic viscosity at 100° C. depending on a difference in molecular weight. In general, as the kinematic viscosity at 40° C. increases, the kinematic viscosity at 100° C. tends to increase as well. For example, a low-viscosity grade has a kinematic viscosity at 40° C. of about 16.8 and a kinematic viscosity at 100° C. of about 3.9, and a high-viscosity grade has a kinematic viscosity at 40° C. of about 410 and a kinematic viscosity at 100° C. of about 40 (all the kinematic viscosities are expressed in the unit [mm²/s]). In the present invention, of the PAOs, one having a kinematic viscosity at 40° C. of from 40 mm²/s to 60 mm²/s and a kinematic viscosity at 100° C. of from 5 mm²/s to 10 mm²/s is used.

When the kinematic viscosity at 40° C. is excessively large, the frictional resistance of the sliding portion at a general use temperature of the vibration device 40 increases. Therefore, the kinematic viscosity at 40° C. is set to 60 mm²/s or less. Meanwhile, when the kinematic viscosity is excessively small, the seeping out of the base oil during use of the vibration device 3 becomes excessive, leading to a reduction in life of the bearing. Particularly in the vibration device 40 of the axial direction drive type as illustrated in FIG. 24, when the base oil seeps out excessively, the base oil pushed out of the sliding portion to the outside of the bearing during the reciprocating motion of the shaft 2 cannot return to the sintered bearing 51, and hence the reduction in life of the bearing becomes remarkable. From the above-mentioned viewpoint, the kinematic viscosity at 40° C. of the base oil is set to 40 mm²/s or more.

In addition, when the kinematic viscosity at 100° C. is excessively small, the base oil is liable to flow out of the surface of the sintered compact even by the short-time heating during the reflow soldering of the vibration device 40, resulting in a reduction in oil impregnation rate of the sintered bearing 51. Therefore, the kinematic viscosity at 100° C. is set to 5 mm²/s or more. Meanwhile, when the kinematic viscosity at 100° C. is excessively large, the kinematic viscosity at 40° C. also increases accordingly to exceed the above-mentioned upper limit (60 mm²/s). Therefore, the kinematic viscosity at 100° C. is set to 10 mm²/s or less.

As the base oil, the PAO may be used alone, but in order to realize low cost, the PAO and an ester-based synthetic oil may be used as a mixture. The ester-based synthetic oil is excellent in heat resistance, and has high thermal stability. In addition, its molecular weight is large and its molecular weight distribution is narrow, and hence its evaporation loss is small. Therefore, even in the case of involving temporary heating in the step of mounting the vibration device 40 as in the sintered bearing 51, the thermal degradation and reduction in oil impregnation amount due to evaporation can be prevented. When the PAO and the ester-based synthetic oil are mixed as described above, the blending amount of the PAO is preferably set to 50 mass % or more.

As the ester-based synthetic oil, a polyol ester-based synthetic lubricating oil and a diester-based synthetic lubricating oil may be used. The polyol ester-based synthetic lubricating oil does not contain R-hydrogen, and hence is more excellent in thermal stability than the diester-based synthetic lubricating oil is. In addition, in the case of the ester-based synthetic lubricating oil, part of the ester adsorbs onto a metal surface to form a lubricating film thereon. The polyol ester-based synthetic lubricating oil has a larger number of adsorptive groups than the diester-based synthetic lubricating oil does, and hence can form a tougher adsorbed film. Therefore, from the aspects of chemical bonding stability and lubricity, the polyol ester-based synthetic lubricating oil is preferably used. Meanwhile, the diester-based synthetic lubricating oil has an advantage of low cost, and hence the diester-based synthetic lubricating oil is preferably used when the aspect of cost is important. Any one of the polyol ester-based synthetic lubricating oil and the diester-based synthetic lubricating oil may be mixed with the PAO. Alternatively, both thereof may be mixed with the PAO. In any case, the kinematic viscosity of the base oil after the mixing is required to satisfy the above-mentioned conditions (the range of from 40 mm²/s or more to 60 mm²/s or less at 40° C., and the range of from 5 mm²/s or more to 10 mm²/s or less at 100° C.).

[Thickener]

As the thickener, a wide range of soap-based thickeners, each of which becomes liquid when heated to its phase transition temperature and crystallizes at a temperature lower than the phase transition temperature to exhibit an oil retaining property, may be used. In particular, a lithium soap, which has an excellent characteristic in terms of heat resistance, is preferably used. The chemical structure of the lithium soap is represented by, for example, $CH_3(CH_2)_{16}COOLi$. Of the lithium soaps, for example, lithium stearate having the following chemical structure may be used.

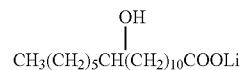

$$CH_3(CH_2)_5CH(OH)(CH_2)_{10}COOLi$$

With regard to the fiber structure of the lithium soap serving as the thickener, for example, a spindle fiber having a linear fibrous form has a diameter and a length of roughly 0.5 μm and from about 3 μm to about 5 μm, respectively. At a temperature lower than the phase transition temperature, fibers of the lithium soap are entangled with each other in a complex manner to constitute a network structure, and the base oil is retained in the network structure.

The addition amount of the thickener in the grease is set to, for example, from 0.1 mass % to 3 mass % (preferably from 0.5 mass % to 1 mass %). When the addition amount is less than 0.1 mass %, the oil retention effect of the grease becomes insufficient, and in particular, the base oil is liable to flow out at high temperature. In addition, when the addition amount is more than 3 mass %, the grease hardens to increase the frictional resistance at the sliding portion between the shaft 2 and the bearing surface.

The grease of the present invention is obtained by adding, to the base oil described above, the thickener together with, as necessary, various additives to be used for general lubricating grease (for example, one kind or a plurality of kinds selected from an antioxidant, a detergent dispersant, an extreme pressure agent, an anti-wear agent, an oiliness agent, a friction modifier, a viscosity index improver, a pour point hardener, a rust preventive, an anti-foaming agent, and the like are used, or all of the foregoing are used). At normal temperature, the thickener is dispersed in the base oil to adopt a micelle structure, and hence the grease is brought into a semi-solid state.

When the grease is heated to a temperature equal to or higher than its phase transition temperature, the grease becomes a liquid having a viscosity close to that of the base oil. The grease that has become a liquid as described above is impregnated into the sintered compact by a method involving vacuum pressure impregnation or the like, to thereby cause the grease to be retained in the fine pores.

Even when the thickener contained in the grease is in a crystallized state at a temperature lower than its phase transition temperature, the thickener is in a state of being accommodated in the fine pores of the sintered compact. Accordingly, with the network structure of the thickener, the base oil can be retained in the fine pores to be prevented from seeping out excessively.

As described above, in the present invention, the sintered compact is impregnated with the grease instead of a lubricating oil. The thickener of the grease retains the base oil with the network structure even in the fine pores of the sintered compact, and hence provides a high oil retaining property. Therefore, as compared to the case of impregnation with the lubricating oil, evaporation and outflow of the base oil are less liable to occur in the first place even at high temperature. In addition, the PAO is used as a main component of the base oil, and hence evaporation of the base oil is less liable to occur also by virtue of unique characteristics of the PAO. Moreover, of the grades of the PAO, one having a higher kinematic viscosity at 100° C. is selected, and hence outflow of the base oil from the fine pores is less liable to occur even at high temperature. Therefore, even when the sintered bearing 51 is temporarily heated to high temperature (220° C. to 260° C.) during the reflow soldering of the vibration device 40 onto the circuit board, evaporation and outflow of the base oil from the sintered bearing 51 can be suppressed, and hence a situation in which the oil impregnation amount of the sintered bearing 51 reduces can be prevented.

Meanwhile, at the use temperature (usually room temperature) of the vibration device 40, the kinematic viscosity of the base oil is small. Accordingly, during use of the vibration device 40, i.e., during operation of its vibration function, the frictional resistance at the sliding portion between the shaft 2 and the bearing surface 1a can be reduced. Therefore, a stable vibration function is obtained. In addition, the adoption of such sintered bearing 51 does not cause a significant rise in manufacturing cost of the vibration device 3.

The phase transition temperature of the grease is around 200° C. (about 198° C.). The temperature of the atmosphere in the furnace is higher than the phase transition temperature, but the period of time for the heating in the furnace is short (several seconds to several tens of minutes). Therefore, during the heating in the furnace, the grease does not become completely liquid, and outflow of the base oil during the heating is kept to the minimum.

As described above, in the present invention, the composition of the lubricant has been investigated to find out the optimal composition, by not only taking into consideration the temperature (low temperature) during use of the bearing, but also taking into consideration the following unique circumstances: the sintered bearing is temporarily heated to high temperature at the time of the mounting of the device (vibration device 40) into which the sintered bearing is incorporated. In this respect, the present invention differs in terms of technical concept from a lubricant selection process for an existing sintered bearing involving investigating the composition of the lubricant by taking into consideration only the use temperature of the sintered bearing (low-temperature environment or high-temperature environment).

In the above description, the present invention has been described by taking as an example the sintered bearing 51 to be used for the vibration device 40 of the axial direction drive type illustrated in FIG. 24. However, also in the vibration device (vibration motor) of the rotary drive type illustrated in FIG. 2, the vibration motor may be reflow-soldered onto a circuit board. Also in that case, the sintered bearing described above may be used as each of the sintered bearings 101, 102 configured to support the rotary shaft 2.

The device using the sintered bearing 51 described above is not limited to the vibration motor and the vibration device 40 illustrated in FIG. 2 and FIG. 24. The sintered bearing 51 of the present invention may be widely used for, for example, other devices to be similarly mounted by the reflow soldering, and further, devices to be temporarily heated under heating conditions similar to those of the reflow soldering.

Figure 25:
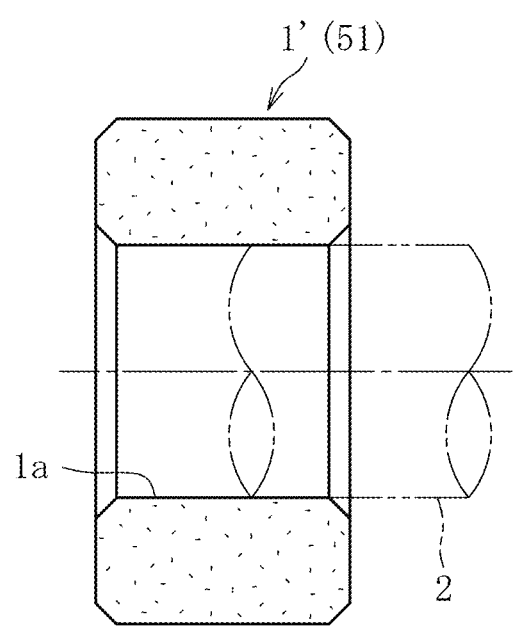
FIG. 25 is a sectional view of a second sintered bearing.

Now, the configuration of the second sintered compact 1' is described with reference to FIG. 25.

The sintered compact 1' is formed by loading, into a mold, raw material powders obtained by mixing various powders, and compressing the raw material powders to form a green compact, followed by sintering the green compact.

The raw material powders are mixed powders containing as main components partially diffusion-alloyed powder, flat copper powder, low-melting point metal powder, and solid lubricant powder. Various molding aids as typified by a lubricant (such as a metal soap) for improving mold releasability are added to the mixed powder as necessary.

As illustrated in FIG. 4, an Fe—Cu partially diffusion-alloyed powder 11 in which a number of grains of copper powder 13 are partially diffused on the surface of an iron powder 12 is used as the partially diffusion-alloyed powder. A partial diffusion portion of the partially diffusion-alloyed powder 11 forms an Fe—Cu alloy, and the alloy portion has a crystalline structure in which iron atoms 12a and copper atoms 13a are bonded to each other and arranged as illustrated in a partial enlarged view of FIG. 4. The partially diffusion-alloyed powder 11 to be used preferably has an average grain diameter of from 75 μm to 212 μm.

As the iron powder 12 constituting the partially diffusion-alloyed powder 11, reduced iron powder, atomized iron powder, or other known iron powders may be used. In this embodiment, the reduced iron powder is used. The reduced iron powder has a substantially spherical but irregular shape. Further, the reduced iron powder has a sponge-like shape (porous shape) having inner pores, and hence the reduced iron powder is also called sponge iron powder. The iron powder 12 to be used has an average grain diameter of preferably from 45 μm to 150 μm, more preferably from 63 μm to 106 μm.

The average grain diameter may be measured by a laser diffraction/scattering method (using, for example, SALD-31000 manufactured by Shimadzu Corporation) involving irradiating a group of grains with laser light, and determining a grain size distribution, and by extension an average grain diameter through calculation from an intensity distribution pattern of diffracted/scattered light emitted therefrom (the average grain diameters of powders described below may be measured by the same method).

In addition, as the copper powder 13 constituting the partially diffusion-alloyed powder 11, generally-used irregular or dendritic copper powder may be used widely. For example, electrolytic copper powder, atomized copper powder, or the like is used. In this embodiment, the atomized copper powder, which has a number of irregularities on its surface, has a substantially spherical but irregular shape in the entirety of its grain, and is excellent in formability, is used. The copper powder 13 to be used has a grain diameter smaller than that of the iron powder 12, specifically has an average grain diameter of 5 μm or more and 45 μm or less.

The ratio of Cu in the partially diffusion-alloyed powder 11 is from 10 wt % to 30 wt % (preferably from 22 wt % to 26 wt %).

The flat copper powder is obtained by flattening raw material copper powder containing water-atomized powder and the like through stamping or pulverization. As the flat copper powder, there is mainly used flat copper powder having a length L of from 20 μm to 80 μm and a thickness t of from 0.5 μm to 1.5 μm (aspect ratio L/t=13.3 to 160). The "length" and the "thickness" herein refer to the maximum geometric dimensions of individual grains of flat copper powder 3 as illustrated in FIG. 6. The apparent density of the flat copper powder is set to 1.0 g/cm$^3$ or less. When the flat copper powder having the above-mentioned size and apparent density is used, the force of adhesion of the flat copper powder to a molding surface is increased, and hence a large amount of flat copper powder can be caused to adhere onto the molding surface.

In order to cause the flat copper powder to adhere onto the molding surface, a fluid lubricant is caused to adhere to the flat copper powder in advance. The fluid lubricant only needs to be caused to adhere to the flat copper powder before loading the raw material powders into the mold. Specifically, the fluid lubricant is caused to adhere to the raw material copper powder preferably before mixing the raw material powders, further preferably in the stage of stamping the raw material copper powder. The fluid lubricant may be caused to adhere to the flat copper powder by means of, for example, feeding the fluid lubricant to the flat copper powder and agitating the fluid lubricant and the flat copper powder within a period after stamping the raw material copper powder until mixing the flat copper powder with other raw material powders. In order to secure an amount of the flat copper powder adhering onto the molding surface, the blending ratio of the fluid lubricant to the flat copper powder is set to 0.1 wt % or more in terms of a weight ratio. In addition, in order to prevent coagulation due to the adhesion of grains of the flat copper powder to each other, the blending ratio is set to 0.8 wt % or less. It is desired that the lower limit of the blending ratio be set to 0.2 wt % or more, and the upper limit of the blending ratio be set to 0.7 wt %. As the fluid lubricant, a fatty acid, in particular, a linear saturated fatty acid is preferred. This kind of fatty acid is expressed by a general formula of $C_{n-1}H_{2n-1}COOH$. As this fatty acid, a fatty acid having Cn within a range of from 12 to 22 may be used, and stearic acid may be used as a specific example.

The low-melting point metal powder is metal powder having a melting point lower than that of copper. In the present invention, metal powder having a melting point of 700° C. or less, for example, powder of tin, zinc, or phosphorus is used. Among others, it is preferred to use tin that is less evaporated at the time of sintering. The average grain diameter of the low-melting point metal powder is preferably set to from 5 μm to 45 μm so as to be smaller than that of the partially diffusion-alloyed powder 11. Those low-melting point metal powders have high wettability to copper. When the low-melting point metal powder is blended in the raw material powders, the low-melting point metal powder melts first at the time of sintering to wet the surface of the copper powder, and then diffuses into copper to allow copper to melt. Liquid phase sintering progresses with an alloy of the molten copper and low-melting point metal, with the result that the bonding strength between respective iron grains, the bonding strength between iron grains and copper grains, and the bonding strength between respective copper grains are increased.

The solid lubricant powder is added so as to reduce friction at the time of metal contact due to sliding between the sintered bearing and the shaft, and graphite is used as an example. As graphite powder in this case, it is desired to use flake graphite powder so as to attain adhesiveness to the flat copper powder. As the solid lubricant powder, molybdenum disulfide powder may be used as well as the graphite powder. The molybdenum disulfide powder has a layered crystal structure, and is peeled in a layered shape. Thus, the adhesiveness to the flat copper powder is attained similarly to flake graphite.

In order to obtain the raw material powders having the above-mentioned powders blended together, it is preferred to blend the partially diffusion-alloyed powder at from 75 wt % to 90 wt %, the flat copper powder at from 8 wt % to 20 wt %, the low-melting point metal powder (for example, tin powder) at from 0.8 wt % to 6.0 wt %, and the solid lubricant powder (for example, graphite powder) at from 0.5 wt % to 2.0 wt %. The reason for such blending ratio is given below.

In the present invention, as described later, the flat copper powder is caused to adhere in a layered shape to the mold at the time of loading the raw material powders into the mold. When the blending ratio of flat copper in the raw material powders is less than 8 wt %, the amount of flat copper adhering onto the mold becomes insufficient, and hence the actions and effects of the present invention cannot be expected. In addition, the amount of the flat copper powder adhering onto the mold is saturated at about 20 wt %. A further increase in blending amount of the flat copper powder poses a problem of increasing cost owing to the use of the costly flat copper powder. When the ratio of the low-melting point metal powder is less than 0.8 wt %, the strength of the bearing cannot be secured. When the ratio of the low-melting point metal powder exceeds 6.0 wt %, the spheroidization effect on the flat copper powder cannot be ignored. In addition, when the ratio of the solid lubricant powder is less than 0.5 wt %, the effect of reducing the friction on the bearing surface is not obtained. When the ratio of the solid lubricant powder exceeds 2.0 wt %, a reduction in strength or the like occurs.

It is desired that the above-mentioned powders be mixed through two separate operations. First, as primary mixing, flake graphite powder and flat copper powder having a fluid lubricant caused to adhere thereto in advance are mixed together with a known mixer. Subsequently, as secondary mixing, partially diffusion-alloyed powder and low-melting point metal powder are added to and mixed with the primarily-mixed powder, and graphite powder is further added and mixed as necessary. The flat copper powder has a low apparent density among the various raw material powders, and is therefore difficult to uniformly disperse in the raw material powders. Thus, when the flat copper powder and the graphite powder having an apparent density at the same level are mixed together in advance through the primary mixing, as illustrated in FIG. 7, a flat copper powder 15 and a graphite powder 14 are caused to adhere to each other and superimposed in a layered shape due to, for example, the fluid lubricant adhering to the flat copper powder, and accordingly the apparent density of the flat copper powder is increased. Therefore, the flat copper powder can be dispersed uniformly in the raw material powders at the time of secondary mixing. When a lubricant is separately added at the time of primary mixing, the adhesion between the flat copper powder and the graphite powder is further promoted, and hence the flat copper powder can be dispersed more uniformly at the time of secondary mixing. As the lubricant to be added in this case, a fluid lubricant of the same kind as or the different kind from the above-mentioned fluid lubricant may be used, and a powder lubricant may be used as well. For example, the above-mentioned molding aid, such as a metal soap, is generally powdery, but has an adhesion force to some extent so that the adhesion between the flat copper powder and the graphite powder can further be promoted.

The adhesion state between the flat copper powder 15 and the flake graphite powder 14 as illustrated in FIG. 7 is maintained to some extent even after the secondary mixing, and hence, when the raw material powders are loaded into the mold, a large amount of graphite powder is caused to adhere onto the surface of the mold together with the flat copper powder.

The raw material powders obtained after the secondary mixing are fed to a mold 20 of a molding machine. As illustrated in FIG. 8, the mold 20 is constructed of a core 21, a die 22, an upper punch 23, and a lower punch 24, and the raw material powders are loaded into a cavity defined by those components of the mold 20. When the upper and lower punches 23 and 24 are brought close to each other to compress the raw material powders, the raw material powders are molded by a molding surface defined by an outer peripheral surface of the core 21, an inner peripheral surface of the die 22, an end surface of the upper punch 23, and an end surface of the lower punch 24, to thereby obtain a cylindrical green compact 25.

Among the metal powders of the raw material powders, the flat copper powder has the lowest apparent density. Further, the flat copper powder has a foil-like shape with the above-mentioned length L and thickness t, and its wider surface has a large area per unit weight. Therefore, the flat copper powder 15 is easily affected by the adhesion force that is generated due to the fluid lubricant adhering onto the surface of the flat copper powder, and further by the Coulomb force or the like. After loading the raw material powders into the mold 20, as illustrated in an enlarged manner in FIG. 9 (enlarged view of the region Q in FIG. 8), the flat copper powder 15 is caused to adhere to the entire region of a molding surface 20a of the mold 20 with its wider surface opposed to the molding surface 20a under a layered state in which a plurality of layers (approximately one to three layers) of the flat copper powder 15 are superimposed. At this time, flake graphite adhering to the flat copper powder 15 is also caused to adhere onto the molding surface 20a of the mold together with the flat copper powder 15 (illustration of graphite is omitted in FIG. 9). Meanwhile, in an inner region of the layered structure of the flat copper 15 (region close to the center of the cavity), the partially diffusion-alloyed powder 11, the flat copper powder 15, a low-melting point metal powder 16, and the graphite powder are brought into a state of being dispersed uniformly as a whole. In the green compact 25 obtained after the molding, the distribution state of those powders is maintained substantially as it is.

After that, the green compact 25 is sintered in a sintering furnace. In this embodiment, the sintering conditions are determined so that an iron structure becomes a two-phase structure containing a ferrite phase and a pearlite phase. When the iron structure is formed of the two-phase structure containing a ferrite phase and a pearlite phase, the hard pearlite phase contributes to improvement in wear resistance, and the wear of the bearing surface is suppressed under high surface pressure. As a result, the life of the bearing can be prolonged.

When the presence ratio of pearlite (γFe) becomes excessively high through diffusion of carbon to reach a ratio comparable to or higher than that of ferrite (αFe), the aggressiveness to the shaft due to pearlite is increased significantly, and hence the shaft is liable to be worn. In order to prevent this phenomenon, the amount of the pearlite phase (γFe) is suppressed to the extent that the pearlite phase (γFe) is present (in a scattered manner) at a grain boundary of the ferrite phase (γFe) (see FIG. 11). The "grain boundary" herein refers to not only a grain boundary formed between powder grains but also a crystal grain boundary 18 formed in the powder grains. When the iron structure is formed of the two-phase structure containing a ferrite phase (αFe) and a pearlite phase (γFe) as described above, the ratios of the ferrite phase (αFe) and the pearlite phase (γFe) in the iron structure are desirably from about 80% to about 95% and from about 5% to about 20%, respectively (αFe:γFe=80%-95%:5%-20%), in terms of an area ratio in an arbitrary cross section of a base part S2 described below. With this, a balance between suppression of the wear of the shaft 2 and improvement in wear resistance of the bearing surface 1a can be achieved.

The growth rate of pearlite mainly depends on a sintering temperature. Thus, it order that the pearlite phase be present at the grain boundary of the ferrite phase in the above-mentioned manner, the sintering is performed at a sintering temperature (furnace atmosphere temperature) of from about 820° C. to about 900° C. through use of a gas containing carbon, such as a natural gas or an endothermic gas (RX gas), as a furnace atmosphere. With this, carbon contained in the gas diffuses into iron at the time of sintering, with the result that the pearlite phase (γFe) can be formed. Sintering at a temperature higher than 900° C. is not preferred because, through such sintering, carbon in the graphite powder reacts with iron, with the result that the pearlite phase increases more than necessary. Along with the sintering, the fluid lubricant, other lubricants, and various molding aids described above burn in the inside of the sintered compact, or vapor from the inside of the sintered compact.

Through the above-mentioned sintering step, a porous sintered compact 1' is obtained. Sizing is carried out on this sintered compact 1', and the grease is further impregnated into the sintered compact 1', to thereby complete the sintered bearing 51.

Figure 26:
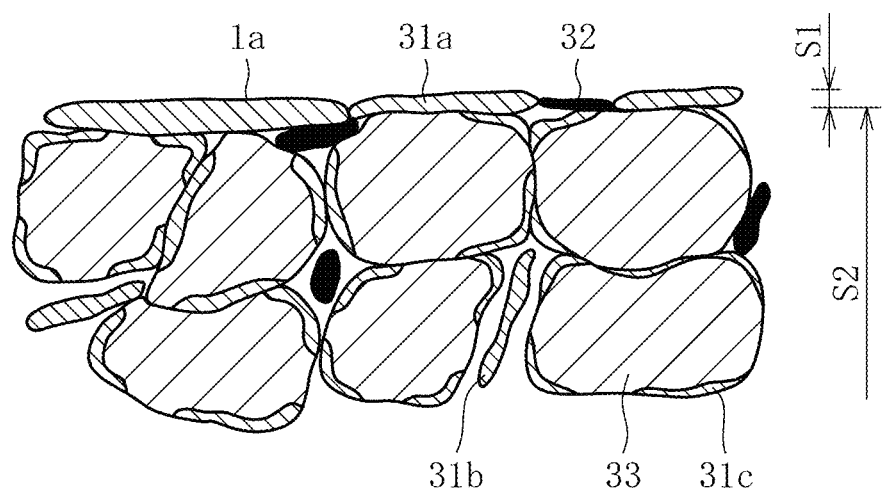
FIG. 26 is an enlarged view of the sintered bearing in a cross section in a radial direction.

A microscopic structure of the sintered compact 1' after the above-mentioned manufacturing steps in the vicinity of its surface is schematically illustrated in FIG. 26.

Figure 9:
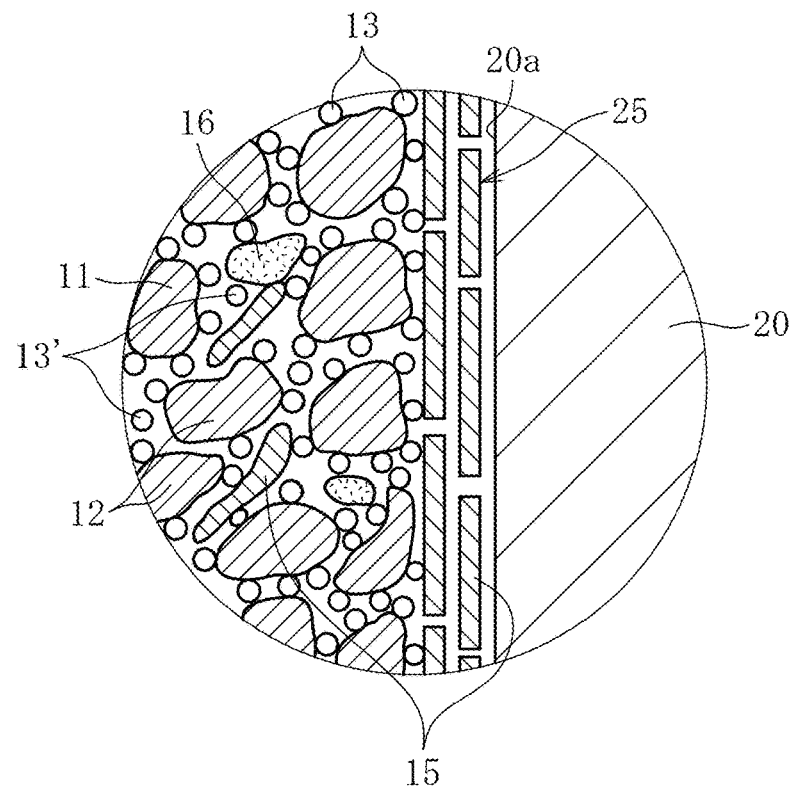
FIG. 9 is an enlarged sectional view of the region Q in FIG. 8.

As illustrated in FIG. 26, in the sintered compact 1' of the present invention, the green compact 25 is formed under a state in which the flat copper powder 15 is caused to adhere in a layered shape to the molding surface 20a (see FIG. 9). Further, deriving from the fact that such flat copper powder 15 is sintered, a surface layer S1 having a concentration of copper higher than those in other portions is formed in the entire surface including the bearing surface 1a. Besides, the wider surface of the flat copper powder 15 is caused to adhere onto the molding surface 20a, and hence many of copper structures 31a of the surface layer S1 have such a flat shape that each copper structure 31a is thinned in a thickness direction of the surface layer S1. The thickness of the surface layer S1 corresponds to the thickness of a layer of the flat copper powder adhering in a layered shape to the molding surface 20a, and is approximately from about 1 μm to about 6 μm. The surface of the surface layer S1 is formed mainly of free graphite 32 (represented by solid black) in addition to the copper structure 31a, and the rest is formed of openings of pores and an iron structure described below. Of those, the copper structure 31a has the largest area, and specifically, the copper structure 31a occupies an area of 60% or more of the surface.

Meanwhile, in a base part S2 which is covered with the surface layer S1 and located inside, two kinds of copper structures (31b and 31c), an iron structure 33, free graphite 32, and pores are formed. The one copper structure 31b (third copper structure) is formed resulting from the flat copper powder 15 in the inside of the green compact 25, and has a flat shape corresponding to the flat copper powder. The other copper structure 31c (first copper structure) is formed through diffusion of the low-melting point metal into the copper powder 13 constituting the partially diffusion-alloyed powder 11, and is formed so as to be brought into contact with the iron structure 33. The first copper structure 31c plays a role in increasing a bonding force between grains as described below.

FIG. 11 is an enlarged illustration of the iron structure 33 and its surrounding structures after the sintering illustrated in FIG. 26. As illustrated in FIG. 11, tin serving as the low-melting point metal melts first at the time of sintering to diffuse into the copper powder 13 constituting the partially diffusion-alloyed powder 11 (see FIG. 4), and thus forms a bronze phase 34 (Cu—Sn). Liquid phase sintering progresses through the bronze phase 34, with the result that the respective iron grains, the iron grains and the copper grains, or the respective copper grains are firmly bonded to each other. In addition, in the individual partially diffusion-alloyed powder 11, molten tin diffuses also into a portion in which part of the copper powder 13 diffuses to form an Fe—Cu alloy, and thus forms an Fe—Cu—Sn alloy (alloy phase 17). The bronze phase 34 and the alloy phase 17 form the first copper structure 31c in combination. As described above, part of the first copper structure 31c diffuses into the iron structure 33, and hence high neck strength can be obtained between the first copper structure 31c and the iron structure 33. In FIG. 11, the ferrite phase (αFe), the pearlite phase (γFe), and the like are represented by shading. Specifically, the ferrite phase (αFe), the bronze phase 34, the alloy phase 17 (Fe—Cu—Sn alloy), and the pearlite phase (γFe) are shaded with increasing darkness in the stated order.

When a general iron powder 19 is used instead of the partially diffusion-alloyed powder 11, as illustrated in FIG. 12A, part of the low-melting point metal powder 16 is present between the flat copper powder 15 and the general iron powder 19. When sintering is performed under such state, there arises a so-called spheroidization problem of the flat copper powder 15, in which the flat copper powder 15 is drawn by the low-melting point metal powder 16 through surface tension of the molten low-melting point metal powder 16 and rounded around the low-melting point metal powder 16 as a core. When the flat copper powder 15 is left spheroidized, the area of the copper structure 31a in the surface layer S1 is reduced (see FIG. 10), resulting in a large influence on the sliding characteristics of the bearing surface.

In contrast, in the present invention, as illustrated in FIG. 13, the partially diffusion-alloyed powder 11 in which almost the entire periphery of the iron powder 12 is covered with the copper powder 13 is used as the raw material powder, and hence a number of grains of the copper powder 13 are present around the low-melting point metal powder 16. In this case, the low-melting point metal powder 16 melting along with sintering diffuses into the copper powder 13 of the partially diffusion-alloyed powder 11 ahead of the flat copper powder 15. In particular, in an initial stage of sintering, this phenomenon is promoted because of the fluid lubricant remaining on the surface of the flat copper powder 15. With this, an influence of the low-melting point metal powder 16 on the flat copper powder 15 of the surface layer S1 can be suppressed (even when the low-melting point metal powder 16 is present just below the flat copper powder 15, surface tension acting on the flat copper powder 15 is reduced). Accordingly, the spheroidization of the flat copper powder 15 in the surface layer can be suppressed, the ratio of the copper structure in the surface of the bearing including the bearing surface 1a is increased, and good sliding characteristics can be obtained. In order to exploit the above-mentioned feature, it is preferred to add the least amount possible of elemental iron powder to the raw material powders. That is, it is preferred that the iron structure 33 be entirely derived from the partially diffusion-alloyed powder.

As described above, in the present invention, the spheroidization of the flat copper powder 15 in the surface layer S1 can be avoided, and hence the blending ratio of the low-melting point metal powder 16 can be increased in the bearing. That is, while it is existing common general technical knowledge that the blending ratio (weight ratio) of the low-melting point metal needs to be suppressed to less than 10 wt % with respect to the flat copper powder 15 in order to suppress the spheroidization influence on the flat copper powder 15, the ratio can be increased to from 10 wt % to 30 wt % according to the present invention. Such increase in blending ratio of the low-melting point metal leads to a further increase in effect of promoting bonding between metal grains through liquid phase sintering, and hence is more effective for an increase in strength of the sintered compact 1'.

With the above-mentioned configuration, in the entire surface of the surface layer S1 including the bearing surface 1a, the area ratio of the copper structure to the iron structure can be 60% or more, and the copper-rich bearing surface less susceptible to oxidation can be stably obtained. In addition, even when the surface layer S1 is worn, the copper structure 31c derived from the copper powder 13 adhering onto the partially diffusion-alloyed powder 11 is exposed on the bearing surface 1a. Therefore, the sliding characteristics of the bearing surface including an initial running-in property and quietness can be improved.

Meanwhile, the base part S2 located inside the surface layer S1 is a hard structure having a small content of copper and a large content of iron as compared to the surface layer S1. Specifically, the base part S2 has the largest content of Fe, and a content of Cu of from 20 wt % to 40 wt %. As described above, the base part S2 occupying most of the sintered compact 1' has a large content of iron, and hence the usage amount of copper in the entire bearing can be reduced, with the result that low cost can be achieved. In addition, the strength of the entire bearing can be enhanced by virtue of the large content of iron.

In particular, in the present invention, the metal having a melting point lower than that of copper is blended in a predetermined amount, and a bonding force between metal grains (between the respective iron grains, between the iron grains and the copper grains, or between the respective copper grains) is increased through liquid phase sintering, and further, high neck strength is obtained between the copper structure 31c and the iron structure 33 derived from the partially diffusion-alloyed powder 11. With this, the copper structure and the iron structure are prevented from escaping from the bearing surface 1a, and the wear resistance of the bearing surface can be improved. In addition, the strength of the bearing can be enhanced. Specifically, radial crushing strength (300 MPa or more) twice or more as high as that of an existing copper-iron-based sintered compact can be achieved. Therefore, as illustrated in FIG. 2 and FIG. 24, even when the sintered bearings 1, 51 are press-fitted and fixed to the inner peripheries of the housings 3, 41, the bearing surfaces 1a do not deform in accordance with the shapes of the inner peripheral surfaces of the housings 3, 41, and the circularity, cylindricity, and the like of each bearing surface 1a can be stably maintained after mounting. Accordingly, after the sintered bearings 1, 51 are press-fitted and fixed to the inner peripheries of the housings, a desired circularity (for example, a circularity of 3 μm or less) can be secured without additional processing for finishing the bearing surface 1a into an appropriate shape with appropriate accuracy (for example, sizing).

Besides, free graphite is precipitated on the entire surface including the bearing surface, and further flake graphite is caused to adhere onto the molding surface 20a in the form in which the flake graphite accompanies the flat copper powder 15. Therefore, the content ratio of graphite in the surface layer S1 is higher than that in the base part S2. As a result, the friction of the bearing surface 1a can be reduced, and the durability of the bearings 1, 51 can be increased.

In the first embodiment described above, the iron structure is formed of the two-phase structure including a ferrite phase and a pearlite phase. However, there is a risk in that the pearlite phase (γFe), which has a hard structure (HV 300 or more) and hence has high aggressiveness to a mating member, allows progression of the wear of the shaft 2 depending on the use conditions of the bearing. In order to eliminate such risk, the entire iron structure 33 may be formed of the ferrite phase (αFe).

In order to form the entire iron structure 33 of the ferrite phase as described above, a sintering atmosphere is set to a gas atmosphere not containing carbon (hydrogen gas, nitrogen gas, argon gas, or the like) or a vacuum atmosphere. With such measure, a reaction between carbon and iron does not occur in the raw material powders. Accordingly, the iron structure after sintering is entirely formed of the soft ferrite phase (αFe) (HV 200 or less). With such configuration, even when the surface layer S1 is worn and the iron structure 33 of the base part S2 is exposed on the surface, the bearing surface 1a can be softened, and the aggressiveness to the shaft can be reduced.

In the above description, there is exemplified a case in which the partially diffusion-alloyed powder in which the copper powder is partially diffused in the iron powder, the flat copper powder, the metal powder having a melting point lower than that of the flat copper powder, and the fixed lubricant powder are used as the raw material powders. However, in place of the partially diffusion-alloyed powder, general iron powder may be used, or mixed powder of the iron powder and the copper powder may be used. Also in this case, it is possible to make only the surface layer copper-rich, and hence the sintered bearing having a good initial running-in property and good quietness can be provided while the usage amount of expensive copper is reduced.

REFERENCE SIGNS LIST 1 sintered bearing
1a bearing surface
1' sintered compact
2 shaft
11 partially diffusion-alloyed powder
12 iron powder
13 copper powder
13' elemental copper powder
14 graphite powder
15 flat copper powder
16 low-melting point metal powder
17 alloy phase
18 crystal grain boundary
19 iron powder
31 (31a to 31d) copper structure
32 free graphite
33 iron structure
34 bronze phase
S1 surface layer
S2 base part

The invention claimed is:

1. A method for manufacturing a sintered bearing comprising: an iron structure and a first copper structure which are formed of partially diffusion-alloyed powder of iron powder and copper powder having a grain diameter smaller than that of the iron powder; and a second copper structure formed of granular elemental copper powder having a grain diameter of 45 μm or less, the sintered bearing having a radial crushing strength of 350 MPa or more, and a ratio of the second copper structure formed of the granular elemental copper powder being 10 mass % or less, the method comprising sintering the partially diffusion-alloyed powder at a sintering temperature of 900° C. or less to form the iron structure and the first copper structure, wherein the partially diffusion-alloyed powder contains 60 mass % or more of powder having a grain diameter of more than 106 μm, and the partially diffusion-alloyed powder has a maximum grain diameter of 150 μm or less, wherein the sintered bearing further comprises: a sintered compact; and a grease impregnated into the sintered compact, wherein the grease contains a thickener, and a base oil having a kinematic viscosity at 40° C. of 40 mm$^2$/s or more and 60 mm$^2$/s or less, and a kinematic viscosity at 100° C. of 5 mm$^2$/s or more and 10 mm$^2$/s or less according to a kinematic viscosity measurement based on JIS K 2283, and a concentration of the thickener in the grease is from 0.1 wt % to 3 wt %.

2. The method according to claim 1, wherein the sintered bearing has a density of 7.0 g/cm$^3$ or more.

3. The method according to claim 1, wherein the sintered bearing further comprises 2 mass % to 3 mass % of a low-melting point substance having a melting point lower than that of copper.

4. The method according to claim 1, wherein the sintered bearing further comprises a surface layer comprising flat copper powder arranged substantially parallel to a surface of the sintered bearing.

5. The method according to claim 1, wherein the partially diffusion-alloyed powder has a grain diameter equal to or less than ½ of a minimum thickness of the sintered bearing.

6. A vibration motor comprising the sintered bearing manufactured according to the method of claim 1.

7. The method according to claim 1, wherein the base oil comprises a poly-α-olefin-based synthetic lubricating oil.

8. The method according to claim 1, wherein the base oil comprises a poly-α-olefin-based synthetic lubricating oil and an ester-based synthetic lubricating oil.

9. The method according to claim 1, wherein the thickener comprises a lithium soap.

10. The method according to claim 1, wherein the sintered bearing is incorporated into a device to be reflow-soldered onto a circuit board.

11. A device to be soldered onto a circuit board through use of a reflow solder, the device comprising the sintered bearing manufactured according to the method a of claim 1.

12. The method according to claim 2, wherein the sintered bearing further comprises 2 mass % to 3 mass % of a low-melting point substance having a melting point lower than that of copper.

13. The method according to claim 2, wherein the sintered bearing further comprises a surface layer comprising flat copper powder arranged substantially parallel to a surface of the sintered bearing.

14. A method for manufacturing a sintered bearing comprising: an iron structure and a first copper structure which are formed of partially diffusion-alloyed powder of iron powder and copper powder having a grain diameter smaller than that of the iron powder; and a second copper structure formed of granular elemental copper powder having a grain diameter of 45 μm or less, the sintered bearing having a radial crushing strength of 350 MPa or more, and a ratio of the second copper structure formed of the granular elemental copper powder being 10 mass % or less, the method comprising sintering the partially diffusion-alloyed powder at a sintering temperature of 900° C. or less to form the iron structure and the first copper structure, wherein the partially diffusion-alloyed powder contains 60 mass % or more of powder having a grain diameter of more than 106 μm, and the partially diffusion-alloyed powder is free from powder having a grain diameter greater than 150 μm, wherein the sintered bearing further comprises: a sintered compact; and a grease impregnated into the sintered compact, wherein the grease contains a thickener, and a base oil having a kinematic viscosity at 40° C. of 40 mm$^2$/s or more and 60 mm$^2$/s or less, and a kinematic viscosity at 100° C. of 5 mm$^2$/s or more and 10 mm$^2$/s or less according to a kinematic viscosity measurement based on JIS K 2283, and a concentration of the thickener in the grease is from 0.1 wt % to 3 wt %.

15. The method according to claim 14, wherein the sintered bearing has a density of 7.0 g/cm$^3$ or more.

16. The method according to claim 14, wherein the sintered bearing further comprises 2 mass % to 3 mass % of a low-melting point substance having a melting point lower than that of copper.

17. The method according to claim 14, wherein the sintered bearing further comprises a surface layer comprising flat copper powder arranged substantially parallel to a surface of the sintered bearing.

18. The method according to claim 14, wherein the partially diffusion-alloyed powder has a grain diameter equal to or less than ½ of a minimum thickness of the sintered bearing.

* * * * *